(12) United States Patent
Shinohara et al.

(10) Patent No.: US 7,474,453 B2
(45) Date of Patent: Jan. 6, 2009

(54) CONTROL APPARATUS FOR OPTICAL DENSITY CHANGING ELEMENT

(75) Inventors: Ryuji Shinohara, Kanagawa (JP); Hideki Kaneiwa, Kanagawa (JP); Atsushi Matsunaga, Kanagawa (JP); Yoshio Ishii, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/129,487

(22) Filed: May 16, 2005

(65) Prior Publication Data

US 2005/0254114 A1 Nov. 17, 2005

(30) Foreign Application Priority Data

May 14, 2004 (JP) ............... P. 2004-144766

(51) Int. Cl.
*G02F 1/15* (2006.01)
(52) U.S. Cl. .................. 359/265; 396/457
(58) Field of Classification Search ........ 359/265; 396/249, 457, 506
See application file for complete search history.

(56) References Cited

U.S. PATENT DOCUMENTS

| | | | | |
|---|---|---|---|---|
| 4,135,790 A | * | 1/1979 | Takahashi et al. | 359/275 |
| 5,076,673 A | * | 12/1991 | Lynam et al. | 359/271 |
| 6,055,089 A | * | 4/2000 | Schulz et al. | 359/270 |
| 6,301,038 B1 | * | 10/2001 | Fitzmaurice et al. | 359/265 |
| 7,002,722 B2 | * | 2/2006 | Xu et al. | 359/273 |
| 2005/0058445 A1 | | 3/2005 | Kaneiwa et al. | |

FOREIGN PATENT DOCUMENTS

| | | | |
|---|---|---|---|
| JP | 9-244072 A | | 9/1997 |
| JP | 2003-270671 | * | 3/2002 |
| JP | 2003270671 | * | 3/2002 |

OTHER PUBLICATIONS

David Cummins, et al., "Ultrafast Electrochromic Windows Based on Redox-Chromophore Modified Nanostructured Semiconducting and Conducting Films", J. Phys. Chem. B, vol. 104, 2000, pp. 11449-11459.

* cited by examiner

*Primary Examiner*—Joseph Martinez
(74) *Attorney, Agent, or Firm*—Sughrue Mion, PLLC

(57) ABSTRACT

A control apparatus for an optical density changing element comprising: an electromotive force generating element comprising an electromagnetic wave sensor (example: phototransistor) and a voltage source (example: battery), wherein the electromotive force generating element generates an electromotive force; an optical density changing element (light regulating filter) including an electrochromic material driven by the electromotive force; and a resistor connected in parallel to the optical density changing element.

15 Claims, 6 Drawing Sheets

CONTROL APPARATUS FOR OPTICAL DENSITY CHANGING ELEMENT

BACKGROUND OF THE INVENTION

1. Field of the Invention

The present invention relates to a control apparatus for an optical density changing element including an electrochoromic material, which changes an optical density utilizing an electromotive force according to an intensity of an electromagnetic wave.

2. Description of the Related Art

A element showing a change in an optical density in response to an electromagnetic wave has a wide field of application. As a material having a function of changing the optical density, namely controlling a light transmission or a light reflection in response to an electromagnetic wave, there are known a photochromic material and an electrochromic material.

The photochromic material is a material capable of changing an optical density thereof in response to a light irradiation, and is applied to sunglasses, an ultraviolet checker, printing-related materials, processed fiber products and the like.

The electrochromic material is a material capable of changing an optical density thereof in response to an electron injection or an electron emission, and is applied to an antiglare mirror for automotives, an automotive window material and the like.

The application of such optical density changing material includes a photographing system, including a camera. For example, a film with lens is recently popular, because of its simplicity in operation, as a camera unit not requiring a film loading operation and enabling a photographing operation immediately after purchase. Also a high sensitivity film is being loaded in order to elevate the value of utilization. However the related film with lens is not provided with a mechanism for regulating an exposure amount, as it is designed for simplicity. Therefore, a film with lens, loaded with a high sensitivity film, results in an overexposure in a photographing operation in a bright environment, thus often generating a failed whitish picture. Therefore, a film with lens capable of automatic switching of a diaphragm according to the light amount at the photographing, utilizing an AE control by a light metering in the photographing operation, has been commercialized. This has significantly reduced the photographing failure caused by the excessive exposure amount.

For realizing a "light regulating filter" for regulating the incident light amount to a photosensitive material, according to the light amount at the photographing operation, in a simple and inexpensive manner, there is proposed a film with lens utilizing the aforementioned photochromic material (for example JP-A No. 5-142700, JP-A No. 6-317815, JP-A No. 11-352642 and JP-A No. 2001-13301). More specifically, a photochromic material means a material having a property for generating a color or increasing an optical density when subjected to a light irradiation of a certain wavelength, and extinguishing the color or decreasing the optical density when the light irradiation is terminated or when subjected to a heating or a light irradiation of a different wavelength, and such property is known in inorganic compounds containing silver halide and in a part of organic compounds. A light regulation is considered possible by positioning a filter, formed by a photochromic material, on an optical axis and executing color generation and color erasing according to the incident light amount.

However, the photochromic compound generally requires about 1 minute for the color generation and about several tens of minutes for color erasing (cf. Solid State and Material Science, 1990, Vol. 16, p. 291), and is therefore difficult to employ as a light regulating system for a photographing light.

On the other hand, the aforementioned electrochromic material is known to be capable of faster color generation and color erasing. More specifically, the electrochromic material means a material having a property of increasing an optical density by an electron injection or an electron ejection under a voltage application, and decreasing the optical density by an electron transfer opposite to that at the increase of the optical density, and such property is known in certain metal oxides and organic compounds.

A light regulating system, laminating a solar cell generating an electromotive force in response to a light with an electrochromic material, is proposed (for example JP-A No. 9-244072). An automatic light regulation according to the light can be expected also in this system. However, in such proposed structure where the solar cell and the electrochromic material are superposed, a part of the light passing through the electrochromic material is inevitably absorbed by the solar cell, and such structure is therefore unsuitable for a system of a camera-related optical element in which it is desired to utilize the incident light amount to the photographic recording medium as maximum as possible in a scene not requiring such light regulation.

SUMMARY OF THE INVENTION

The present inventors have realized a "light regulating filter" capable of regulating the incident light amount to the photosensitive material according to the light amount at the photographing operation by combining an optical density changing element utilizing an electrochromic material with a solar cell.

The electrochromic element can thus be applied to a light-regulating filter, an antiglare mirror, a light-regulating window and the like, and, for automatically controlling the color generation/erasure of the electrochromic element according to the illuminating intensity of light, a solar cell is usually employed.

As such electrochromic element control apparatus, there is also known, in addition to the foregoing, an apparatus having an electrochromic element, a solar cell for driving such element and a resistor connected in parallel to the electrochromic element (JP-A No. 2-25836).

The solar cell, capable of generating an electromotive force by itself in response to an electromagnetic wave, has advantages of a limited number of components and a low cost.

However, a solar cell employed as the voltage source results in drawbacks that (1) a wide space is required for installing the solar cell, and (2) when a part of the surface of the solar cell is hidden for example by a shadow, a responsiveness to the illumination intensity is deteriorated as a stable voltage cannot be supplied to the electrochromic element. Particularly a high voltage or a large solar cell is required in case of controlling an electrochromic element of a large area, so that these drawbacks (1) and (2) become more conspicuous. Therefore, for controlling an electrochromic element, there is desired a control apparatus capable of achieving a space saving and providing a satisfactory response. Also there is desired a control apparatus of a simple structure with a low manufacturing cost.

The aforementioned problems can be resolved by separating functions of a "solar cell" into a response to light and a generation of an electromotive force, and by replacing the "solar cell" with an "electromagnetic wave sensor" combined with a "voltage source". In spite of a fact that the "solar cell"

serving as an electromotive force generating element in response to an electromagnetic wave has an advantage of a limited number of components (therefore a lower cost), the present invention is characterized in that the number of components is intentionally increased to include a voltage source (for example a dry battery) in addition to the electromagnetic wave sensor (for example an optical sensor such as a phototransistor), thereby solving the problems.

(1) An control apparatus for an optical density changing element comprising:

an electromotive force generating element comprising an electromagnetic wave sensor and a voltage source, wherein the electromotive force generating element generates an electromotive force;

an optical density changing element including an electrochromic material driven by the electromotive force; and a resistor connected in parallel to the optical density changing element.

(2) The control apparatus as described in (1) above, wherein the optical density changing element includes a nanoporous semiconductor material in which the electrochromic material is adsorbed, and the nanoporous semiconductor material has a roughness factor larger than 20.

(3) The control apparatus as described in (1) or (2) above, wherein the optical density changing element in a color erased state has an optical density of 0.2 or less at a wavelength of 400 nm.

(4) The control apparatus as described in any of (1) to (3) above, wherein the optical density changing element in a color erased state has an average optical density of 0.1 or less in each of a wavelength range of 400 to 500 nm, a wavelength range of 500 to 600 nm and a wavelength range of 600 to 700 nm.

(5) The control apparatus as described in any of (1) to (4) above, wherein the optical density changing element includes at least two electrochromic materials, and wherein each of the at least two electrochromic materials independently has a wavelength where an electrochromic material generates a color so as to change an optical density.

(6) The control apparatus as described in any of (1) to (5) above, wherein the electromagnetic wave sensor is a material of which resistance changes according to an intensity of an electromagnetic wave.

(7) The control apparatus as described in any of (1) to (6) above, wherein the voltage source of the optical density changing element is a battery.

(8) The control apparatus as described in any of (1) to (7) above, wherein the electromagnetic wave sensor is a phototransistor.

DETAILED DESCRIPTION OF THE INVENTION

Figure 1:
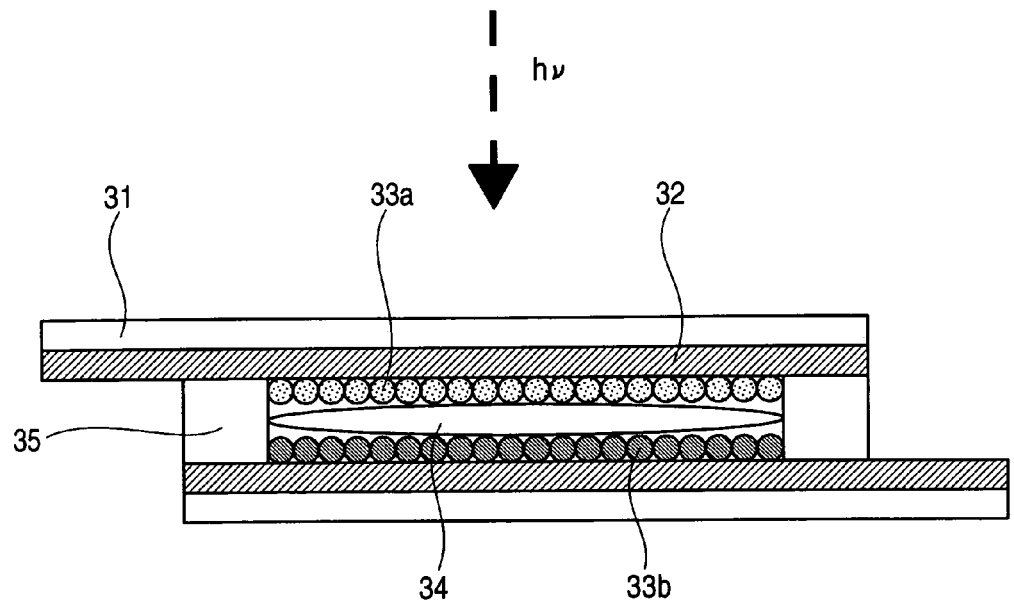
FIG. 1 shows a schematic cross-sectional view showing a representative example of configuration of an optical density changing element of the present invention.

In the following, the present invention will be clarified in detail.

In the invention, an "optical density" means a value A calculated by a following equation (1) for an intensity $I_0$ of an incident light to the optical density changing element and an intensity $I_T$ of a transmitted light:

$$A = -\log(I_T/I_0) \quad \text{equation 1)}$$

In the invention, a "nanoporous material" means a material of which a surface area is increased by forming irregularities of an order of nanometers for promoting adsorption of a larger amount of materials on the surface. A level of porosity is represented by a "roughness factor".

In the invention, a "roughness factor of a nanoporous semiconductor material" is a proportion of an actually effective surface area with respect to a projected plane area of a surface of a semiconductor material layer. More specifically, it can be measured by a BET method.

In the invention, a "color erased state" means a state where an optical density changing element is maintained at an optical density as low as possible, for example by short-circuiting the poles of the optical density changing element, or by applying an inverse voltage between the poles, namely applying a voltage in a direction inverse to a voltage applied at the color generation.

In the invention, a "semiconductor material" follows an ordinary definition. For example, according to Dictionary of Physics (published by Baifu-kan), the "semiconductor material" means a substance having an electrical resistance between a metal and an insulating substance.

In the invention, an "adsorption of an electrochromic material to a nanoporous semiconductor material" means a phenomenon in which an electrochromic material is adsorbed by a chemical coupling or a physical coupling to the surface of a nanoporous semiconductor material, and the definition of adsorption follows an ordinary definition. The adsorption of an electrochromic material to a nanoporous semiconductor material can be detected for example by a following method.

A nanoporous semiconductor material on which an electrochromic material is assumed to be adsorbed is immersed in a 0.1M NaOH solution and shaken for 3 hours at 40° C. A used amount of the solution is determined by a coating amount of the nanoporous semiconductor material, and is suitably 0.5 ml for a coating amount of 1 g/m². The solution after the shaking is subjected to a measurement with a spectrophotometer. As a result, there is detected an absorption band of the employed electrochromic material, and, in case the absorbance of the absorption peak is 0.01 or higher, the electrochromic material is considered to have been "adsorbed" in the nanoporous semiconductor material. A type and a concentration of the employed immersing solution (NaOH in the foregoing explanation), and a temperature and a time of shaking are determined according to the types of the nanoporous semiconductor material and the electrochromic material, and are not limited to the foregoing description.

In the invention, an "electromagnetic wave" follows an ordinary definition. For example, according to Dictionary of Physics (published by Baifu-kan), an electric field and a magnetic field include a field static in time and a wave field changing in time and propagating to a distant location in space, and such wave field is defined as an electromagnetic wave. More specifically, it is classified into a γ-ray, an X-ray, an ultraviolet light, a visible light, an infrared light, and an electric wave. The electromagnetic wave considered in the invention includes all these, but, in case of applying the optical element of the invention to a light regulating system of a camera unit, it preferably relates to an ultraviolet light, a visible light and an infrared light, more preferably an ultraviolet light and a visible light.

The optical element of the invention includes a electromotive force generating element for generating an electromotive force by an electromagnetic wave and an optical density changing element which changes an optical density by such electromotive force, and, as a change in the optical density of the optical density changing element takes place according to the electromotive force generated by the electromotive force generating element, namely according to the electromagnetic wave, it can therefore be utilized as a light-regulating element for changing a transmitted light amount according to the intensity of the electromagnetic wave.

In the following there will be explained elements constituting the optical device of the invention.

The electromagnetic wave sensor of the invention is not particularly restricted as long as it is formed by a material showing a change in resistance in response to the intensity of an electromagnetic wave, and can be, for example, a phototransistor, a CdS sensor, a photodiode, a CCD sensor, a CMOS sensor, or an NMOS sensor. A preferred electromagnetic wave sensor in the invention is a phototransistor or a photodiode, and the photodiode can be an Si photodiode, an InGaAs photodiode, a GaAsP photodiode or a Ge photodiode. The material constituting the electromagnetic wave sensor may be suitably selected according to a wavelength of the electromagnetic wave to be responded. For example, in case of mounting the optical density changing element on a film with lens, a spectral sensitivity of the electromagnetic wave sensor is preferably close to that of a device for EV value measurement.

Also the invention is not limited to employing the electromagnetic wave sensor singly. More specifically, it is possible also to employ in combination an intensity-attenuating filter in order to regulate the intensity of the electromagnetic wave irradiating the electromagnetic wave sensor, or to employ in combination a filter for regulating a transmitted wavelength of the electromagnetic wave, in order to regulate the wavelength of the electromagnetic wave irradiating the electromagnetic wave sensor.

The electromagnetic wave sensor of the invention preferably has a response as fast as possible to the electromagnetic wave. A response speed of the electromagnetic wave sensor is preferably 1 sec or less, more preferably 0.1 sec or less, and further preferably 0.01 sec or less. Also a preferable resistance change in the electromagnetic wave sensor is, for example, from 5000 Ω to 100 Ω in response to a change in the illumination intensity from EV 8 to EV 13.

The voltage source in the invention is not particularly restricted and can be a dry battery, a lead battery, a diesel power generator or a wind power generator. The dry battery can be a primary battery such as an alkali dry battery or a manganese dry battery, or a secondary battery such as a nickel-cadmium battery, a nickel-hydrogen battery, or a lithium ion battery. The voltage source of the invention is preferably constituted of a power source of an equipment in which the optical density changing element is mounted. Therefore, in case the optical density changing element is mounted on a film with lens, there is preferred a primary battery; in case it is mounted on a cellular phone with a camera function, a secondary battery is preferable; in case it is mounted on an electronic still camera, a primary battery or a secondary battery is preferable; and in case it is mounted on a room mirror of an automobile, a lead battery is preferably employed.

The resistor connected in parallel to the optical density changing element of the invention serves to short-circuit a charge on the electrochromic element when the light irradiation is absent or is of a low intensity, in order to improve the color erasing response of the electrochromic element when the environment changes from a brighter situation to a darker situation. The resistor connected in parallel to the optical density changing element preferably has a resistance lower than an internal resistance of the electromagnetic wave sensor in the absence of the light irradiation.

In the invention, "element which shows a change in optical density (optical density changing element)" means an element which changes an optical density by an electromotive-force generated by the electromotive force generating element, namely an element which changes an optical density by an electrical energy, thereby changing a transmittance of the electromagnetic wave.

The optical density changing element has a semiconductor material in which a material showing a change in the optical density in response to an electrical energy (electrochromic material) is adsorbed, and is provided further with a substrate bearing an electroconductive coating, an electrolyte realizing an electrical conductivity in the optical density changing element and the like. FIG. 1 shows a representative structure of the optical density changing element. Referring to FIG. 1, electrochromic materials are adsorbed (33a, 33b) in semiconductor materials which are made porous. The electrochromic materials change the optical density respectively in response to electric energies supplied from upper and lower electroconductive coatings 32 that are separated from each other by a spacer 35 and are present on substrates (e.g., substrate 31). An electrolyte 34 is present in a gap between the electrochromic materials 33a and 33b. In response to such change of the electrochromic material in the optical density, an incident electromagnetic wave hv is absorbed by the electrochromic material whereby the transmittance is changed. The optical density changing element is not limited to the form illustrated in FIG. 1 but can assume various forms according to the application, for example, an optical filter, a lens, a diaphragm, a mirror, a window pane, eyeglasses or a display panel. For a photographing unit (preferably camera unit), an optical filter, a lens or a diaphragm is preferable.

A substrate constituting the optical density changing element is not particularly restricted, and can be, for example, glass, plastics, polyethylene terephthalate (PET), polyethylene naphthalate (PEN), triacetyl cellulose (TAC), polycarbonate (PC), polysulfone, polyethersulfone (PES), polyether ether ketone, polyphenylene sulfide, polyarylate (PAR), polyamide, polyimide (PIM), polystyrene, a norbornene resin (Arton), an acrylic resin, or polymethyl methacrylate (PMMA), which can be suitably selected according to the application and the form. There is preferably selected a material showing little absorption to the electromagnetic wave of the object of the optical device of the invention, and, glass, PET, PEN, TAC or acrylic resin is particularly preferable for the light of $\lambda=400$ to 700 nm. Also for avoiding a loss of the transmitted light by a reflection on the substrate surface, an antireflective layer (for example a thin silicon oxide layer) is preferably provided thereon. Also various functional layers may be provided on the surface, such as an impact absorbing layer for preventing the element from an impact, an antiscratch layer for preventing the element from scratch, and an electromagnetic wave absorbing layer for cutting off an unintended electromagnetic wave (for example ultraviolet light in an optical device for visible light).

An electroconductive layer constituting the optical density changing element is not particularly restricted, and can be formed, for example, of a metal film (gold, silver, copper, chromium, palladium, tungsten or an alloy thereof), an oxide semiconductor film (tin oxide, silver oxide, zinc oxide, vanadium oxide, ITO (indium oxide doped with tin oxide), antimony-doped tin oxide (ATO), FTO (fluorine-doped tin oxide), AZO (aluminum-doped zinc oxide), a conductive nitride film (titanium nitride, zirconium nitride, or hafnium nitride), a conductive boronide film ($LaB_6$), a spinel compound ($MgInO_4$, $CaGaO_4$), a electroconductive polymer film (polypyrrole/$FeCl_3$), an ionic conductive film (polyethylene oxide/$LiClO_4$), or an inorganic/organic composite film (indium oxide powder/saturated polyester resin). It is preferable to select a material of low absorption to the electromagnetic wave of the object of the optical device of the invention, and tin oxide, FTO or ITO is particularly preferable for the light of $\lambda=400$ to 700 nm. Also in order to reduce the absorption of the electromagnetic wave of the object, the electroconductive layer is preferably as thin as possible within an extent that the electrical conductivity can be secured. More specifically, the electroconductive layer preferably has a thickness of 1000 nm or less, more preferably 200 nm or less and particularly preferably 100 nm or less.

A semiconductor material constituting the optical density changing element is not particularly restricted to following examples, but can be formed by a metal oxide, a metal sulfide or a metal nitride.

A metal oxide can be, though not restrictive, titanium oxide, zinc oxide, silicon oxide, lead oxide, tungsten oxide, tin oxide, indium oxide, niobium oxide, cadmium oxide, bismuth oxide, aluminum oxide, ferrous oxide or a composite compound thereof, or such compound doped with fluorine, chlorine, antimony, phosphor, arsine, boron, aluminum, indium, gallium, silicon, germanium, titanium, zirconium, hafnium or tin. There can also be employed titanium oxide surfacially coated with ITO, antimony-doped tin oxide or FTO.

A metal sulfide can be, though not restrictive, zinc sulfide, cadmium sulfide or a composite compound thereof, or such compound doped with aluminum, gallium, or indium. There can also be employed another material surfacially coated with a metal sulfide.

A metal nitride can be, though not restrictive, aluminum nitride, gallium nitride, indium nitride or a composite compound thereof, or such compound doped with a small amount of different atoms (tin, germanium etc.). There can also be employed another material coated on its surface with a metal nitride. It is preferable to select a material of low absorption for the electromagnetic wave of the object of the optical device of the invention, and, for the light of $\lambda=400$ to 700 nm, titanium oxide, tin oxide, zinc oxide, zinc sulfide or gallium nitride is preferable, and tin oxide or zinc oxide is particularly preferable.

In the invention, an adsorption of the electrochromic material on such semiconductor material realizes smooth injection and ejection of electrons in the electrochromic element, thereby achieving a change in the optical density of the optical density changing element within a short time. A larger adsorption amount of the electrochromic material on the semiconductor material enables a color development of a higher density. In order to achieve an adsorption of the electrochromic material in a larger amount, the semiconductor material is preferably given a nanoporous structure to obtain a larger surface area, preferably with a roughness factor of 20 or higher, particularly preferably 150 or higher.

Such porous structure can be formed, for example, by binding ultra fine particles of a nanometer order. In such case, by optimizing a size and a size dispersion of the employed particles, it is possible to minimize a loss in the transmitted light, caused by absorption or scattering of the electromagnetic wave in the semiconductor material. A size of the employed particles is preferably 100 nm or less, more preferably 1 to 60 nm, and further preferably 2 to 40 nm. Also a dispersion of the size is preferable a single dispersion. It is also possible to improve the response speed of the optical element of the invention, also by optimizing the particle size and the size dispersion.

In the invention, the semiconductor material, in which the electrochromic material is adsorbed, may be employed in two or more layers. In such case, the layers may have a same composition or different compositions. Also a semiconductor material, in which the electrochromic material is adsorbed, may be combined with a semiconductor material in which the electrochromic material is not adsorbed.

An electrochromic material constituting the optical density changing element can be an organic dye such as a viologen dye, a phenothiazine dye, a styryl dye, a ferrocene dye, an anthraquinone dye, a pyrazoline dye, a fluoran dye, or a phthalocyanine dye; an electroconductive polymer such as polystyrene, polythiophene, polyaniline, polypyrrole, polybenzine, or polyisothianaphthene; or an inorganic compound such as tungsten oxide, iridium oxide, nickel oxide, cobalt oxide, vanadium oxide, molybdenum oxide, titanium oxide, indium oxide, chromium oxide, manganese oxide, Prussian blue, indium nitride, tin nitride, or zirconium nitrochloride.

In the invention, in case a specified part of an organic compound is called a "group", such part may not be substituted or may be substituted with a substituent (up to a possible maximum number) of one or more kinds. For example an "alkyl group" means a substituted or non-substituted alkyl group.

Such substituent, represented by W, is not particularly restricted and can be, for example, a halogen atom, an alkyl group (including a cycloalkyl group, a bicycloalkyl group, and a tricycloalkyl group), an alkenyl group (including a cycloalkenyl group, and a bicycloalkenyl group), an alkinyl group, an aryl group, a heterocyclic group, a cyano group, a hydroxyl group, a nitro group, a carboxyl group, an alkoxy group, an aryloxy group, a silyloxy group, a heterocyclic oxy group, an acyoxy group, a carbamoyloxy group, an alkoxycarbonyloxy group, an aryloxycarbonyloxy group, an amino group (including an alkylamino group, an arylamino group and a heterocyclic amino group), an ammonio group, an acylamino group, an aminocarbonylamino group, an alkoxycarbonylamino group, an aryloxycarbonylamino group, a sulfamoylamino group, an alkyl-or aryl-sulfonylamino group, a mercapto group, an alkylthio group, an arylthio group, a heterocyclic thio group, a sulfamoyl group, a sulfo group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a phosphono group, a silyl group, a hydrazino group, a ureido group, a boronic acid group (—B(OH)$_2$), a phosphato group (—OPO(OH)$_2$), a sulfato group (—OSO$_3$H, or other known substituents.

Also two W's may be combined to form a ring (an aromatic or non-aromatic hydrocarbon ring, or a heterocycle, which may further be combined to form a polycondensed rings; such as a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolidine ring, a quinoline ring, a phthalazine ring, a naphthylidine ring, a quinoxaline ring, a quinoxazoline ring, an isoquinoline ring, a carbazole ring, a phenanthridine ring, an acrydine ring, a phenanthroline ring, a thianthrene ring, a chromen ring, a xanthene ring, a phenoxathine ring, a phenothiazine ring, or a phenazine ring).

In the aforementioned substituents W, any hydrogen atom present therein may be substituted by the aforementioned group. Examples of such substituent include —CONHSO$_2$— (a sulfonylcarbamoyl group or a carbonylsulfamoyl group), —CONHCO— (a carbonylcarbamoyl group) and —SO$_2$NHSO$_2$— (a sulfonylsulfamoyl group). More specific examples include an alkylcarbonylaminosulfonyl group (such as acetylaminosulfonyl), an arylcarbonylaminosulfonyl group (such as benzoylaminosulfonyl), an alkylsulfonylaminocarbonyl group (such as methylsulfonylaminocarbonyl), and an arylsulfonylaminocarbonyl group (such as p-methylphenylsulfonylaminocarbonyl).

A viologen dye is a compound represented by structures shown in general formulas (1), (2) and (3):

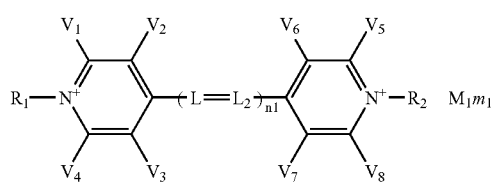

(1)

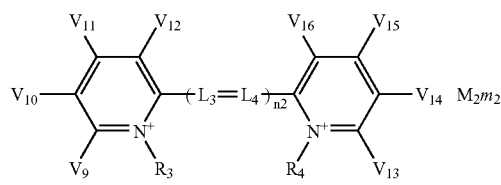

(2)

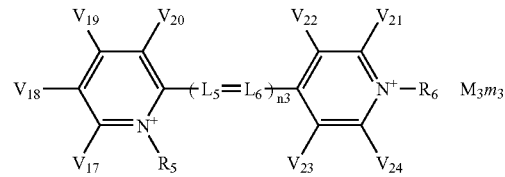

(3)

In the general formulas (1), (2) and (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent.

$R_1$, $R_2$, $R_3$, $R_4$, $R_5$ and $R_6$ each independently represents a hydrogen atom, an alkyl group, an aryl group or a heterocyclic group.

$L_1$, $L_2$, $L_3$, $L_4$, $L_5$ and $L_6$ each independently represents a methine group or a nitrogen atom.

$n_1$, $n_2$ and $n_3$ each independently represents 0, 1 or 2.

$M_1$, $M_2$ and $M_3$ each independently represents a charge balancing counter ion, and $m_1$, $m_2$ and $m_3$ each independently represents a number equal to or larger than 0 necessary for neutralizing the charge of a molecule.

$V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$ and $V_{24}$ each independently represents a hydrogen atom or a monovalent substituent, and Vs may be mutually bonded or may form a ring, or V may be bonded with R1 to $R_6$ or $L_1$ to $L_6$.

The monovalent substituent can be W mentioned above.

$R_1$, $R_2$, $R_3$, $R_4$, $R_5$ and $R_6$ each independently represents a hydrogen atom, an alkyl group, an aryl group or a heterocyclic group, preferably an alkyl group, an aryl group or a hetrocyclic group, and further preferably an alkyl group or an aryl group, and particularly preferably an alkyl group. Specific preferred examples of the alkyl group, the aryl group and the hetrocyclic group represented as $R_1$ to $R_6$ carbon atoms, more preferably with 1 to 7 carbon atoms and particularly preferably with 1 to 4 carbon atoms (such as methyl, ethyl, propyl, isopropyl, butyl, isobutyl, hexyl, octyl, dodecyl or octadecyl), and a substituted alkyl group preferably with 1 to 18 carbon atoms, more preferably with 1 to 7 carbon atoms and particularly preferably with 1 to 4 carbon atoms {For example it can be an alkyl group substituted with the aforementioned W as a substituent. In particular there is preferred an alkyl group having an acid group. The acid group means a group having a dissociable proton and releasing a proton depending upon pKa and an environmental pH of such as a sulfo group, a carboxyl group, a sulfato group, a —CONHSO$_2$— group (sulfonylcarbamoyl group or carbonylsulfamoyl group), a —CONHCO— group (carbonylcarbamoyl group), a —SO$_2$NHSO$_2$— group (sulfonylsulfamoyl group), a sulfonamide group, a sulfamoyl group, a phosphato (—OP(=O) (OH)$_2$) group, a phosphono group (—P(=O) (OH)$_2$) group, a boronic acid group, or a phenolic hydroxyl group. For example there is preferred a proton releasing acidic group capable of dissociation of 90% or more within a pH range of 5 to 11, more preferably a sulfo group, a carboxyl group, a —CONHSO$_2$— group, a —CONHCO— group, a —SO$_2$NHSO$_2$— group, a phosphato group, or a phosphono group, and further preferably a carboxyl group, a phosphato group, or a phosphono group, and particularly preferably a phosphato group or a phosphono group and most preferably a phosphono group.

Specific preferred examples include an aralkyl group (such as benzyl, 2-phenylethyl, 2-(4-biphenyl)ethyl, 2-sulfobenzyl, 4-sulfobenzyl, 4-sulfophenethyl, 4-phosphobenzyl or 4-carboxybenzyl), an unsaturated hydrocarbon group (such as an allyl group or a vinyl group (thus a substituted alkyl group also including an alkenyl group and an alkinyl group)), a hydroxyalkyl group (such as 2-hydroxyethyl or 3-hydroxypropyl), a carboxyalkyl group (such as carboxymethyl, 2-carboxyethyl, 3-carboxypropyl, or 4-carboxybutyl), a phosphatoalkyl group (such as phosphatomethyl, 2-phosphatoethyl, 3-phosphatopropyl, or 4-phosphatobutyl), a phosphonoalkyl group (such as phosphonomethyl, 2-phosphonoethyl, 3-phosphonopropyl, or 4-phosphonobutyl), an alkoxyalkyl group (such as 2-methoxyethyl or 2-(2-methoxyethoxy)ethyl), an aryloxyalkyl group (such as 2-phenoxyethyl, 2-(4-biphenyloxy)ethyl, 2-(1-naphthoxy)ethyl, 2-(4-sulfophenoxy)ethyl, or 2-(2-phosphophenoxy)ethyl), an alkoxycarbonylalkyl group (such as ethoxycarbonylmethyl, or 2-benzyloxycarbonylethyl), an aryloxycarbonylalkyl group (such as 3-phenoxycarbonylpropyl or 3-sulfophenoxycarbonylpropyl), an acyloxyalkyl group (such as 2-acetyloxyethyl), an acylalkyl group (such as 2-acetylethyl), a carbamoylalkyl group (such as 2-morpholinocarbonylethyl), a sulfamoylalkyl group (such as N,N-dimethylsulfamoylmethyl), a sulfoalkyl group (such as 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, or 3-(2-pyridyl)-3-sulfopropyl), a sulfoalkenyl group, a sulfatoalkyl group (such as 2-sulfatoethyl, 3-sulfatopropyl or 4-sulfatobutyl), a heterocycle-substituted alkyl group (such as 2-(pyrrolidin-2-on-1-yl)ethyl, 2-(2-pyridyl)ethyl, tetrahydrofurfuryl or 3-pyridiniopropyl), an alkylsulfonylcarbamoylalkyl group (such as methanesulfonylcarbamoylmethyl), an acylcarbamoylalkyl group (such as acetylcarbamoylmethyl), an acylsulfamoylalkyl group (such as acetylsulfamoylmethyl), an alkylsulfonylsulfamoylalkyl group (such as methanesulfonylsulfamoylmethyl), an ammonioalkyl group (such as 3-(trimethylammonio)propyl or 3-ammoniopropyl), an aminoalkyl group (such as 3-aminopropyl, 3-(dimethylamino)propyl, or 4-(methylamino)butyl) and a guanidinoalkyl group (such as 4-guanidinobutyl)}.

Preferred examples also include a substituted or non-substituted aryl group preferably with 6 to 20 carbon atoms, more preferably 6 to 10 carbon atoms and particularly preferably 6 to 8 carbon atoms (substituted aryl group can be, for example, an aryl group substituted with W cited above as examples of the substituent, preferably an aryl group having an acid group, more preferably an aryl group substituted with a carboxyl group, a phosphate group or a phosphono group, particularly preferably an aryl group substituted with a phosphate group or a phosphono group, and most preferably an aryl group substituted with a phosphono group; and specific examples including phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl or 4-phosphonophenyl), and a substituted or non-substituted heterocyclic group preferably with 1 to 20 carbon atoms, more preferably 3 to 10 carbon atoms and particularly preferably 4 to 8 carbon atoms (substituted heterocyclic group can be, for example, a heterocyclic group substituted with W cited above as examples of the substituent, preferably a heterocyclic group having an acid group, more preferably a heterocyclic group substituted with a carboxyl group, a phosphato group or a phosphono group, particularly preferably a heterocyclic group substituted with a phosphato group or a phosphono group, and most preferably a heterocyclic group substituted with a phosphono group; and specific examples including 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 2-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl or 4-phosphono-2-pyridyl).

Such group may be bonded with another R, $V_1$ to $V_{24}$ or $L_1$ to $L_6$.

$L_1$, $L_2$, $L_3$, $L_4$, $L_5$ and $L_6$ each independently represents a methine group or a nitrogen atom, preferably a methine group. The methine group represented by $L_1$ to $L_6$ may have a substituent, which can be W mentioned above. The substituent can be, for example, a substituted or non-substituted alkyl group with 1 to 15 carbon atoms, preferably 1 to 10 carbon atoms and particularly preferably 1 to 5 carbon atoms (such as methyl, ethyl, 2-carboxyethyl, 2-phosphatoethyl or 2-phosphonoethyl), a substituted or non-substituted aryl group with 6 to 20 carbon atoms, preferably 6 to 15 carbon atoms and further preferably 6 to 10 carbon atoms (such as phenyl, o-carboxyphenyl, o-phosphatophenyl or o-phosphonophenyl), a substituted or non-substituted heterocyclic group with 3 to 20 carbon atoms, preferably 4 to 15 carbon atoms and further preferably 6 to 10 carbon atoms (such as an N,N-dimethylbarbituric acid group), a halogen atom (such as chlorine, bromine, iodine or fluorine), an alkoxy group with 1 to 15 carbon atoms, preferably 1 to 10 carbon atoms and particularly preferably 1 to 5 carbon atoms (such as methoxy or ethoxy), an amino group with 0 to 15 carbon atoms, preferably 2 to 10 carbon atoms and particularly preferably 4 to 10 carbon atoms (such as methylamino, N,N-dimethylamino or N-methyl-N-phenylamino, or N-methyl-piperadino), an alkylthio group with 1 to 15 carbon atoms, preferably 1 to 10 carbon atoms and particularly preferably 1 to 5 carbon atoms (such as methylthio or ethylthio), and an arylthio group with 6 to 20 carbon atoms, preferably 6 to 12 carbon atoms and particularly preferably 6 to 10 carbon atoms (such as phenylthio or p-methylphenylthio). It may also be bonded with another methine group to form a ring, or bonded with $V_1$ to $V_{24}$ or $R_1$ to $R_6$.

$n_1$, $n_2$ and $n_3$ each independently represents 0, 1 or 2, preferably 0 or 1, and further preferably 0. In case $n_1$ to $n_3$ are 2 or larger, methine groups or nitrogens are repeated, but they need not be same.

$M_1$, $M_2$ and $M_3$ are included in the formula for indicating presence of a cation or an anion when needed to neutralize the ionic charge of the compound. A typical cation can be an inorganic cation such as a hydrogen ion ($H^+$), an alkali metal ion (such as sodium ion, potassium ion, or lithium ion), or an alkali earth metal ion (such as calcium ion), or an organic cation such as an ammonium ion (ammonium ion, tetraalkylammonium ion, triethylammonium ion, pyridinium ion, ethylpyridinium ion or 1,8-diazabicyclo[5,4,0]-7-undecenium ion). An anion can be an inorganic anion or an organic anion for example a halogen anion (such as fluorine ion, chlorine ion or iodine ion), a substituted arylsulfonic acid anion (such as p-toluenesulfonic acid ion or p-chlorobenzenesulfonic acid ion), an aryldisulfonic acid ion (such as 1,3-benzenedisulfonic acid ion, 1,5-naphthalenedisulfonic acid ion, or 2,6-naphthalenedisulfonic acid ion), an alkylsulfuric acid ion (such as methylsulfuric acid ion), sulfuric acid ion, thiocyanic acid ion, perchloric acid ion, tetrafluoroboric acid ion, picric acid ion, acetic acid ion or trifluoromethanesulfonic acid ion. It is also possible to utilize another dye having a charge opposite to that of the ionic polymer or the dye. $CO_2^-$, $SO_3^-$, and $P(=O)(-O^-)_2$ can be represented, when having a hydrogen ion as a counter ion, as $CO_2H$, $SO_3H$ and $P(=O)(-OH)_2$.

$m_1$, $m_2$ and $m_3$ represent numbers of 0 or larger required for balancing the charge, preferably numbers of 0 to 4, more preferably 0 to 2, and 0 in case an intramolecular salt is formed.

In the following, examples of the viologen dye are shown, but the present invention is not limited to such examples.

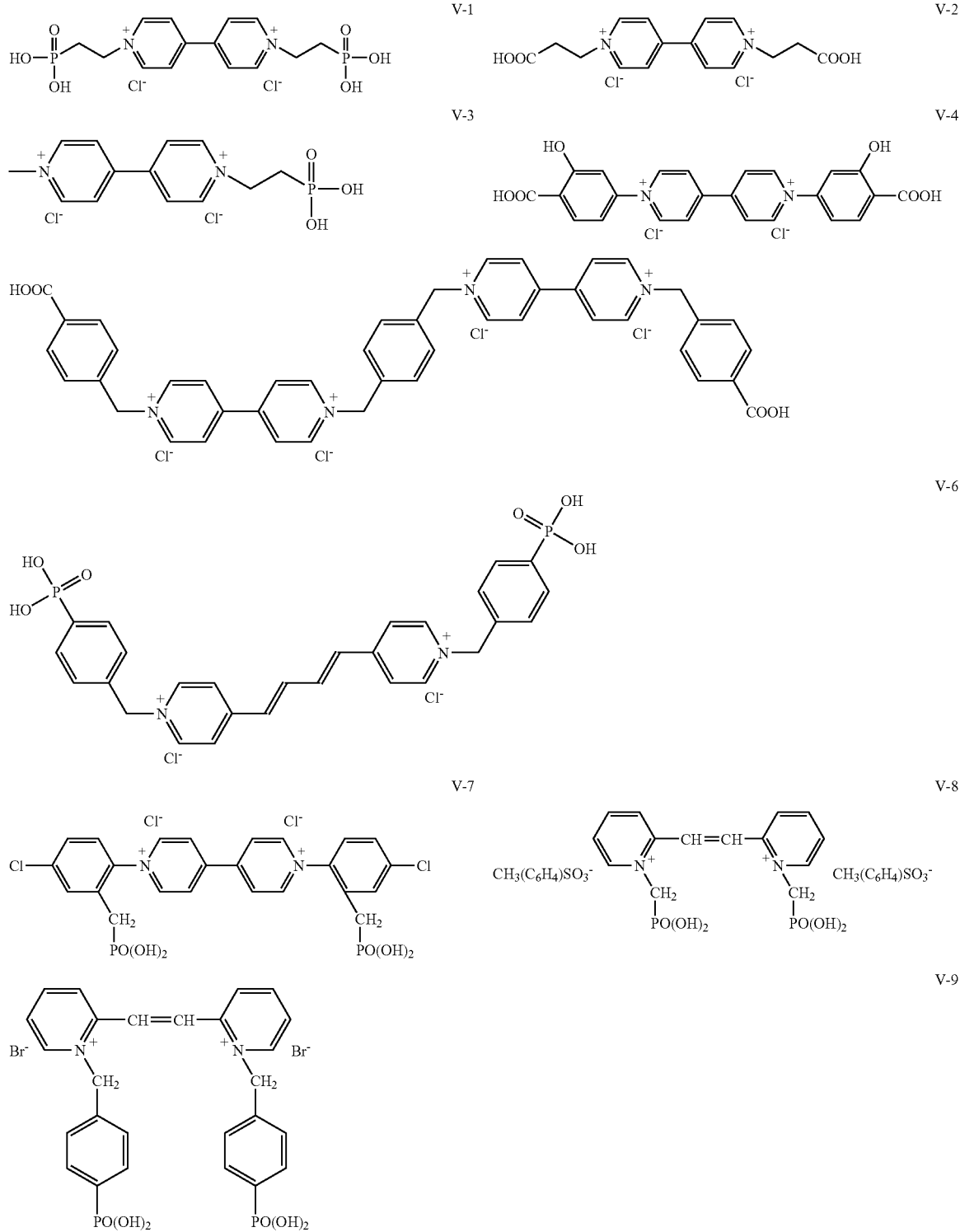

-continued

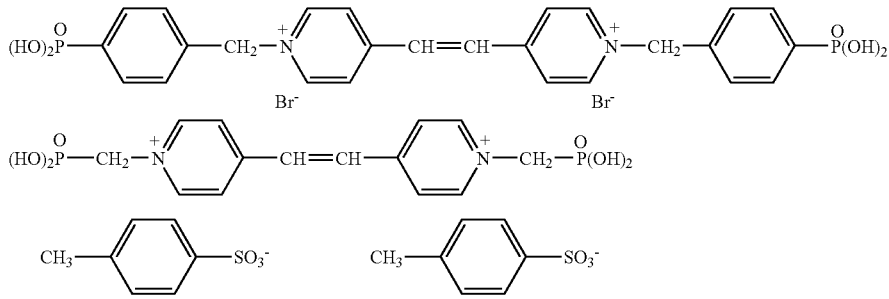

V-10

A phenothiazine dye is a compound represented by a following general formula (6).

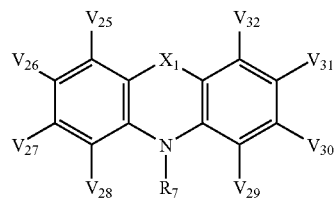

(6)

In the general formulas (6), $V_{25}$, $V_{26}$, $V_{27}$, $V_{28}$, $V_{29}$, $V_{30}$, $V_{31}$ and $V_{32}$ each independently represents a hydrogen atom or a monovalent substituent, and Vs may be mutually bonded or may form a ring, or V may be bonded with another $R_7$.

The monovalent substituent can be W cited above.

$R_7$ represents a hydrogen atom, an alkyl group, an aryl group or a heterocyclic group, preferably an alkyl group, an aryl group or a heterocyclic group, and further preferably an alkyl group or an aryl group, and particularly preferably an alkyl group. Specific preferred examples of the alkyl group, the aryl group and the heterocyclic group represented as $R_7$ include a non-substituted alkyl group preferably with 1 to 18 carbon atoms, more preferably with 1 to 7 carbon atoms and particularly preferably with 1 to 4 carbon atoms (such as methyl, ethyl, propyl, isopropyl, butyl, isobutyl, hexyl, octyl, dodecyl or octadecyl), and a substituted alkyl group preferably with 1 to 18 carbon atoms, more preferably with 1 to 7 carbon atoms and particularly preferably with 1 to 4 carbon atoms (For example it can be an alkyl group substituted with the aforementioned W as a substituent, in particular an alkyl group having an acid group.). The acid group is a group having a dissociable proton and releasing a proton depending upon pKa and an environmental pH, such as a sulfo group, a carboxyl group, a sulfato group, a —CONHSO$_2$— group (sulfonylcarbamoyl group or carbonylsulfamoyl group), a —CONHCO— group (carbonylcarbamoyl group), a —SO$_2$NHSO$_2$— group (sulfonylsulfamoyl group), a sulfonamide group, a sulfamoyl group, a phosphato (—OP(═O)(OH)$_2$) group, a phosphono group (—P(═O) (OH)$_2$) group, a boronic acid group, or a phenolic hydroxyl group. For example there is preferred a proton releasing acidic group capable of dissociation of 90% or more within a pH range of 5 to 11, more preferably a sulfo group, a carboxyl group, a —CONHSO$_2$— group, a —CONHCO— group, a —SO$_2$NHSO$_2$— group, a phosphato group, or a phosphono group, and further preferably a carboxyl group, a phosphato group, or a phosphono group, and particularly preferably a phosphato group or a phosphono group and most preferably a phosphono group.

Specific preferred examples include an aralkyl group (such as benzyl, 2-phenylethyl, 2-(4-biphenyl)ethyl, 2-sulfobenzyl, 4-sulfobenzyl, 4-sulfophenethyl, 4-phosphobenzyl or 4-carboxybenzyl), an unsaturated hydrocarbon group (such as an allyl group or a vinyl group (thus a substituted alkyl group also including an alkenyl group and an alkinyl group)), a hydroxyalkyl group (such as 2-hydroxyethyl or 3-hydroxypropyl), a carboxyalkyl group (such as carboxymethyl, 2-carboxylethyl, 3-carboxypropyl, or 4-carboxybutyl), a phosphatoalkyl group (such as phosphatomethyl, 2-phosphatoethyl, 3-phosphatopropyl, or 4-phosphatobutyl), a phosphonoalkyl group (such as phosphonomethyl, 2-phosphonoethyl, 3-phosphonopropyl, or 4-phosphonobutyl), an alkoxyalkyl group (such as 2-methoxyethyl or 2-(2-methoxyethoxy)ethyl), an aryloxyalkyl group (such as 2-phenoxyethyl, 2-(4-biphenyloxy)ethyl, 2-(1-naphthoxy)ethyl, 2-(4-sulfophenoxy)ethyl, or 2-(2-phosphophenoxy)ethyl), an alkoxycarbonylalkyl group (such as ethoxycarbonylmethyl, or 2-benzyloxycarbonylethyl), an aryloxycarbonylalkyl group (such as 3-phenoxycarbonylpropyl or 3-sulfophenoxycarbonylpropyl), an acyloxyalkyl group (such as 2-acetyloxyethyl), an acylalkyl group (such as 2-acetylethyl), a carbamoylalkyl group (such as 2-morpholinocarbonylmethyl), a sulfamoylalkyl group (such as N,N-dimethylsulfamoylmethyl), a sulfoalkyl group (such as 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, or 3-(2-pyridyl)-3-sulfopropyl), a sulfoalkenyl group, a sulfatoalkyl group (such as 2-sulfatoethyl, 3-sulfatopropyl or 4-sulfatobutyl), a heterocycle-substituted alkyl group (such as 2-(pyrrolidin-2-on-1-yl)ethyl, 2-(2-pyridyl)ethyl, tetrahydrofurfuryl or 3-pyridiniopropyl), an alkylsulfonylcarbamoylalkyl group (such as methanesulfonylcarbamoylmethyl), an acylcarbamoylalkyl group (such as acetylcarbamoylmethyl), an acylsulfamoylalkyl group (such as acetylsulfamoylmethyl), an alkylsulfonylsulfamoylalkyl group (such as methanesulfonylsulfamoylmethyl), an ammonioalkyl group (such as 3-(trimethylammonio)propyl or 3-ammoniopropyl), an aminoalkyl group (such as 3-aminopropyl, 3-(dimethylamino)propyl, or 4-(methylamino)butyl) and a guanidinoalkyl group (such as 4-guanidinobutyl)}.

Preferred examples also include a substituted or non-substituted aryl group preferably with 6 to 20 carbon atoms, more preferably 6 to 10 carbon atoms and particularly preferably 6 to 8 carbon atoms (substituted aryl group can be, for example, an aryl group substituted with W cited above as examples of the substituent, preferably an aryl group having an acid group, more preferably an aryl group substituted with a carboxyl group, a phosphato group or a phosphono group, particularly preferably an aryl group substituted with a phosphato group or a phosphono group, and most preferably an aryl group substituted with a phosphono group; and specific examples including phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl or 4-phosphonophenyl), and a substituted or non-substituted heterocyclic group preferably with 1 to 20 carbon atoms, more preferably 3 to 10 carbon atoms and particularly preferably 4 to 8 carbon atoms (substituted heterocyclic group can be, for example, a heterocyclic group substituted with W cited above as examples of the substituent, preferably a heterocyclic group having an acid group, more preferably a heterocyclic group substituted with a carboxyl group, a phosphato group or a phosphono group, particularly preferably a heterocyclic group substituted with a phosphato group or a phosphono group, and most preferably a heterocyclic group substituted with a phosphono group; and specific examples including 2-furyl, 2-thienyl, 2-pyridyl, 3-pyrazolyl, 3-isooxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 2-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl or 4-phosphono-2-pyridyl).

It may also be bonded to $V_{25}$ to $V_{32}$.

$X_1$ represents a sulfur atom, an oxygen atom, a nitrogen atom (N—Ra), a carbon atom (CVaVb), or a selenium atom, preferably a sulfur atom. Ra represents a hydrogen atom, an alkyl group, an aryl group or a heterocyclic group, and can be and is preferably similar to $R_1$ to $R_7$ mentioned above. Va and Vb each represents a hydrogen atom or a monovalent substituent, and can be and is preferably similar to $V_1$ to $V_{32}$ mentioned above.

$M_4$ is included in the formula for indicating presence of a cation or an anion when needed to neutralize the ionic charge of the compound. A typical cation can be an inorganic cation such as a hydrogen ion ($H^+$), an alkali metal ion (such as sodium ion, potassium ion, or lithium ion), or an alkali earth metal ion (such as calcium ion), or an organic cation such as an ammonium ion (ammonium ion, tetraalkylammonium ion, triethylammonium ion, pyridinium ion, ethylpyridinium ion or 1,8-diazabicyclo[5,4,0]-7-undecenium ion). An anion can be an inorganic anion or an organic anion for example a halogen anion (such as fluorine ion, chlorine ion or iodine ion), a substituted arylsulfonic acid anion (such as p-toluenesulfonic acid ion or p-chlorobenzenesulfonic acid ion), an aryldisulfonic acid ion (such as 1,3-benzenedisulfonic acid ion, 1,5-naphthalenedisulfonic acid ion, or 2,6-naphthalenedisulfonic acid ion), an alkylsulfuric acid ion (such as methylsulfuric acid ion), sulfuric acid ion, thiocyanic acid ion, perchloric acid ion, tetrafluoroboric acid ion, picric acid ion, acetic acid ion or trifluoromethanesulfonic acid ion. It is also possible to utilize another dye having a charge opposite to that of the ionic polymer or the dye. $CO_2^-$, $SO_3^-$, and $P(=O)(-O^-)_2$ can be represented, when having a hydrogen ion as a counter ion, as $CO_2H$, $SO_3H$ and $P(=O)(-OH)_2$.

$m_4$ represents a number of 0 or larger required for balancing the charge, preferably a number of 0 to 4, more preferably 0 to 2, and 0 in case an intramolecular salt is formed.

In the following, examples of the phenothiazine dye are shown, but the present invention is not limited to such examples.

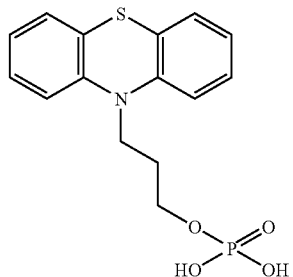

P-1

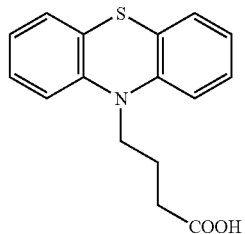

P-2

A styryl dye is a compound having a basic skeleton represented by a following formula (7).

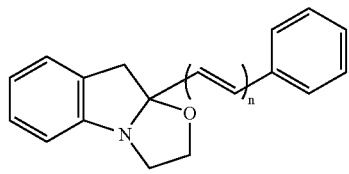

(7)

In the formula, n represents 1 to 5. This compound may have an arbitrary substituent in an arbitrary position, and it is particularly preferable to have an adsorbing group such as a carboxyl group, a sulfonic acid group or a phosphonic acid group. Following compounds are shown as specific examples, but the invention is not limited to such examples.

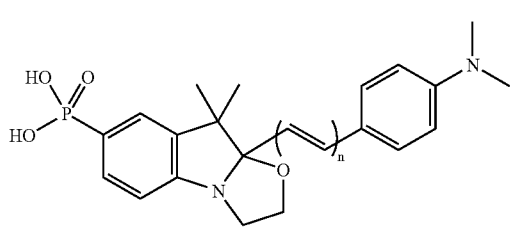

S-1

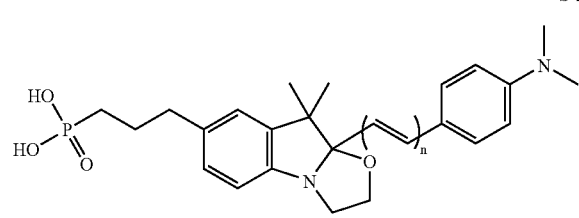

S-2

-continued

S-3

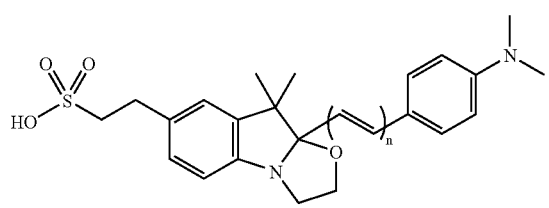

Among such electrochromic materials, an organic compound can be controlled as to its absorption wavelength by changing substituents thereof. It is also preferable to employ two or more electrochromic materials for changing the optical density, whereby the optical density changing element can be changed as to its optical densities at different wavelengths.

In case of utilizing an optical element of the invention as a light regulating element for a camera unit or the like, it preferably has absorption characteristics close to neutral gray corresponding to a uniform light absorption, and the optical density changing element is preferably capable of absorbing visible light, more preferably visible light of plural different wavelengths, and more preferably blue, green and red light. This can be realized by a combination of materials with visible light absorption ranges. Preferred examples of the combination of two or more kinds include viologen dye/phenothiazine dye, viologen dye/ferrocene dye, phthalocyanine dye/Prussian blue, viologen dye/nickel oxide, viologen dye/iridium oxide, tungsten oxide/phenothiazine dye, viologen dye/phenothiazine dye/styryl dye, two viologen dyes (different in substituent)/phenothiazine dye, two viologen dyes (different in substituent)/styryl dye, and two viologen dyes (different in substituent)/nickel oxide.

Also in order to accelerate an electrochemical reaction of such electrochromic material, an auxiliary compound that can be oxidized or reduced may be present in the optical density changing element. The auxiliary compound may or may not show a change in the optical density in $\lambda$=400 to 700 nm by oxidation or reduction. The auxiliary compound may be present on the metal oxide like the electrochromic material, or may be dissolved in the elctrolyte or may singly form a layer on an electric conductive layer.

An electrolyte constituting the optical density changing element is constituted of a solvent and a supporting electrolyte. The supporting electrolyte receives a charge load and is never involved in an electrochemical reaction, thereby serving to increase conductivity. The solvent is preferably a polar solvent, and can specifically be water, an alcohol such as methanol or ethanol, a carboxylic acid such as acetic acid, acetonitrile, propionitrile, glutaronitrile, adiponitrile, methoxyacetonitrile, dimethylacetamide, methylpyrrolidinone, formamide, N,N-dimethylformamide, dimethyl sulfoxide, dimethoxyethane, propylene carbonate, ethylene carbonate, γ-butyrolactone, tetrahydrofuran, dioxolane, sulfolane, trimethyl phosphate, pyridine, hexamethylenoic triamide or polyethylene glycol.

The supporting electrolyte serves as an ion and functions as a charge carrier in the solvent, and is a salt formed by a combination of easily ionizable anion and cation. The cation can be a metal ion represented by $Li^+$, $Na^+$, $K^+$, $Rb^+$ or $Cs^+$, or a quaternary ammonium ion represented by tetrabutylammonium ion. Also the anion can be a halogen ion represented by $Cl^-$, $Br^-$, $I^-$ or $F^-$, a sulfate ion, a nitrate ion, a perchlorate ion, a tosylate ion, a tetrafluoroborate ion, or a hexafluorophosphate ion. Other electrolytes include a fused salt system represented by LiCl/KCl, a solid electrolyte system represented by an ionic conductive member or an ionic superconductive member, and a solid polymer electrolyte system represented by a membrane-shaped ionic conductive material such as an ion exchange membrane.

In the optical device of the invention, it is preferable to maintain an optical density at $\lambda$=400 nm in a color erased state at 0.2 or less, particularly preferably 0.125 or less, by suitably combining the materials of the optical density changing element, namely by optimizing the types of the substrate, the conductive layer and the electrochromic material, and by optimizing the type and the particle size of the semiconductor material. It is also preferable, in a similar manner, to maintain all of an average optical density at $\lambda$=400 to 500 nm in a color erased state, an average optical density at $\lambda$=500 to 600 nm in a color erased state, and an average optical density at $\lambda$=600 to 700 nm in a color erased state, at 0.1 or less. On the other hand, in a color generated state in response to an electromagnetic wave irradiation, an average optical density in $\lambda$=400 to 700 nm is preferably 0.5 or higher, more preferably 0.8 or higher, and particularly preferably 0.95 or higher.

In the optical element of the invention, the optical density changing element and the electromotive force generating element may be connected either directly or through a circuit having an amplifying or protective function. A preferred circuit has a resistor connected in parallel to the optical density changing element. Such bypass resistor accelerates a cancellation of a charge localized in the anode and cathode of the optical density changing element when the light irradiation is absent or is weak in intensity. As a result, the optical density changing element can be improved in the color erasing response. In such case, the resistor connected in parallel to the optical density changing element preferably has a resistance lower than an internal resistance of the electromagnetic wave sensor in the absence of the light irradiation, preferably 1 Ω to 100 kΩ, more preferably 200 Ω to 50 kΩ.

The optical device of the invention can be applied to an automotive window material, a display apparatus or a camera-related optical device. The efficacy of the optical device of the invention can be exhibited particularly in a camera-related optical device, and it is applicable to any camera unit such as a large- or medium-format camera, a single-lens reflex camera, a compact camera, a film with lens, a digital camera, a broadcasting camera, a movie film camera, a movie digital camera, a camera unit for a cellular phone, or an 8 mm movie camera. An example capable of exhibiting the efficacy of the optical device is a simple photographing system not requiring a complex control mechanism, represented by a film with lens. Another example capable of exhibiting the efficacy is a digital camera utilizing a CCD or a CMOS device as an image pickup device, in which the optical device is effective for covering a limited dynamic range of the image pickup device.

In case of mounting the optical device of the invention in a camera unit, the optical density changing element is preferably positioned on an optical axis of a lens. Also the electromotive force generating element, the optical density changing element and the photosensitive element of the camera (photosensitive material (for example a film) or CCD) preferably have an as large overlapping as possible in the optical absorption characteristics (light absorbing wavelength and spectral sensitivity). In particular, the optical density changing element and the photosensitive element of the camera preferably have an as large overlapping as possible in the spectral sensitivity range. In this manner, there can be realized a neutral gray light-regulating property over the entire spectral sensitivity range of the camera.

EXAMPLES

In the following, the present invention will be clarified further by examples, reference examples and comparative examples, but the present invention is naturally not limited to such examples.

Reference Example 1, Comparative Example

There will be explained a reference example in which an optical device having a solar cell as the electromotive force generating element is mounted in a film with lens.

Figure 2:
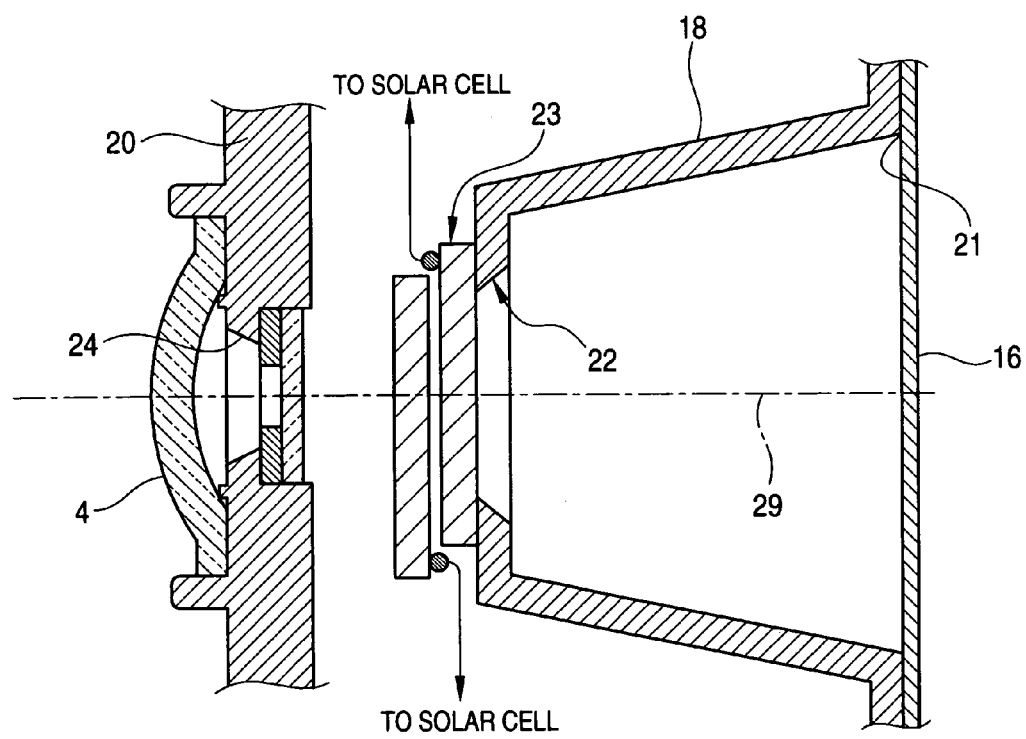
FIG. 2 shows a schematic cross-sectional view of a principal portion of a film with lens having an optical element of a reference example.
Figure 3:
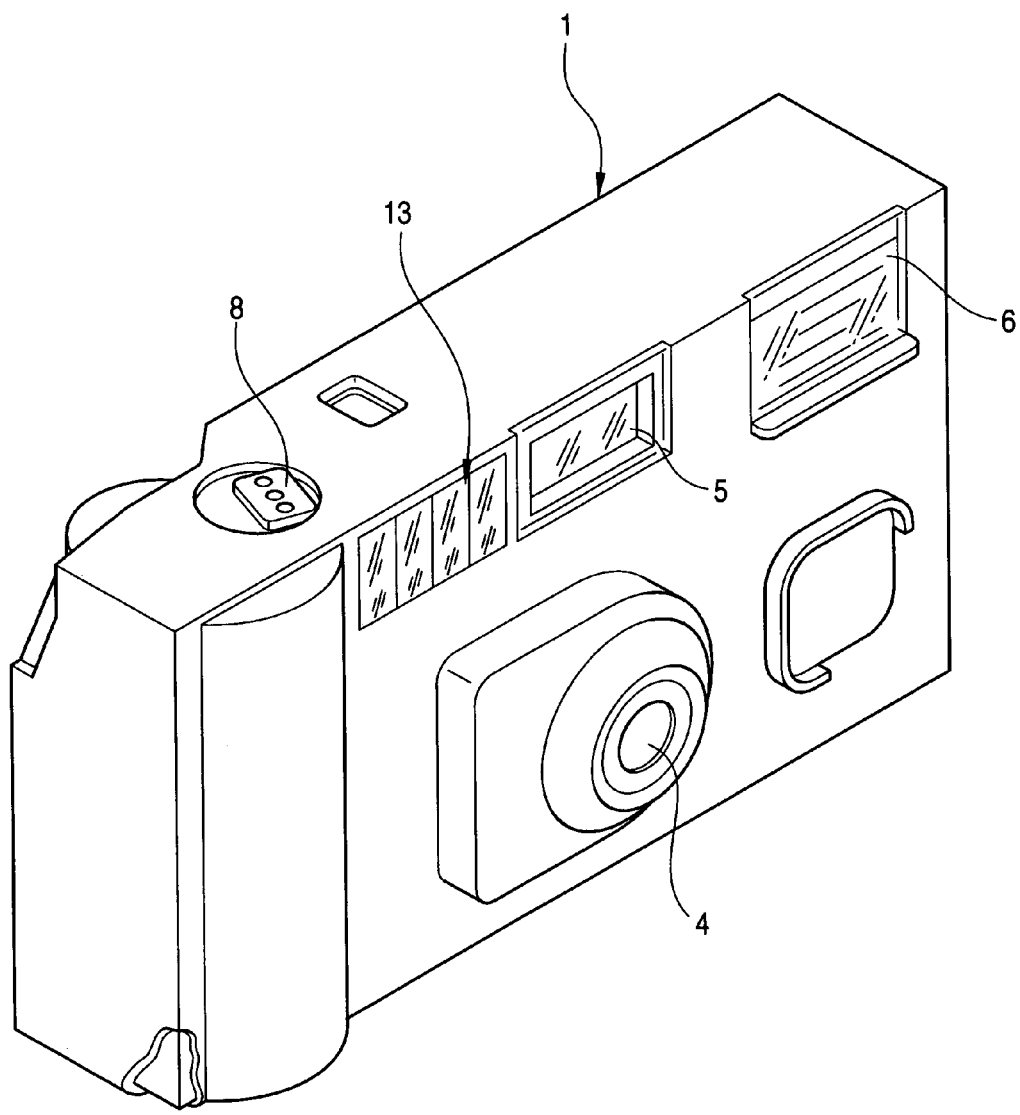
FIG. 3 shows an external view of a principal portion of a film with lens having an optical element of a reference example.

This film unit with lens 1 is equipped, as shown in FIGS. 2 and 3, with (1) a light regulating filter 23 (optical density changing element) and (2) a solar cell 13 (electromotive force generating element). The solar cell 13 provided outside the unit generates an electromotive force corresponding to the intensity of the external light, and the light regulating filter 23 regulates the light amount arriving at a photographic film 16 according to such electromotive force thereby preventing an overexposed negative film under a high luminance environment. As shown in FIG. 3, the film unit with lens 1 contains a view finder 5, a strobe flash unit 6, a shutter button 8 and a photographing lens 4. As shown in FIG. 2, light regulating filter 23 is positioned on optical axis 29 of photographing lens 4. Photographing lens 4 is mounted in a lens holder 20, which also holds diaphragm 24. Photographic film 16 covers an aperture 21 in one side of a light shielding tube 18 that contains an exposure aperture 22 on an opposite side. In the following, there will be explained details and preparing methods for (1) the light-regulating filter and (2) the solar cell.

(1) Light-Regulating Filter

A light-regulating filter was prepared by a procedure of (i) coating of titanium oxide nanoparticles for cathode, (ii) coating of tin oxide nanoparticles for anode, (iii) adsorption of an electrochromic dye, and (iv) assembly of a filter element.

(i) Coating of Titanium Oxide Nanoparticles for Cathode

In an aqueous dispersion of titanium oxide of a diameter of about 10 nm, polyvinyl alcohol was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transparent conductive glass, the coating liquid was coated uniformly so as to obtain an amount of titanium oxide of 6 $g/m^2$. After the coating, the glass substrate was calcined for 30 minutes at 450° C. to eliminate the polymer, thereby obtaining a titanium oxide nanoporous electrode. The electrode prepared in the aforementioned process had a surface roughness factor of about 750.

(ii) Coating of Tin Oxide Nanoparticles for Anode

In an aqueous dispersion of tin oxide of a diameter of about 5 nm, polyethylene glycol (molecular weight 20,000) was added and agitated uniformly to obtain a coating liquid. A transparent glass with an antireflective layer of a thickness of 0.7 mm, covered with a conductive $SnO_2$ sputtered film, was employed as a coating substrate. On the $SnO_2$ film of the transparent conductive glass, the coating liquid was coated uniformly, then heated to 450° C. over 100 minutes and calcined for 30 minutes at 450° C. to eliminate the polymer. The coating and the calcining were repeated until tin oxide reached a total coating amount of 7 $g/m^2$, thereby obtaining a tin oxide nanoporous electrode. The electrode prepared in the aforementioned process had a surface roughness factor of about 750.

(iii) Adsorption of Electrochromic Material

The following electrochromic dyes (V-1) and (P-1) were employed as the electrochromic materials. The electrochromic dye V-1 has a property of generating a color by being reduced at the cathode (– pole), while the electrochromic dye P-1 has a property of generating a color by being oxidized at the anode (+ pole). The electrochromic dyes V-1 and P-1 have mutually different developed colors. Thus, in color generation, the two electrochromic materials show changes in the optical densities at different wavelengths.

Electrochromic dyes (V-1) and (P-1)

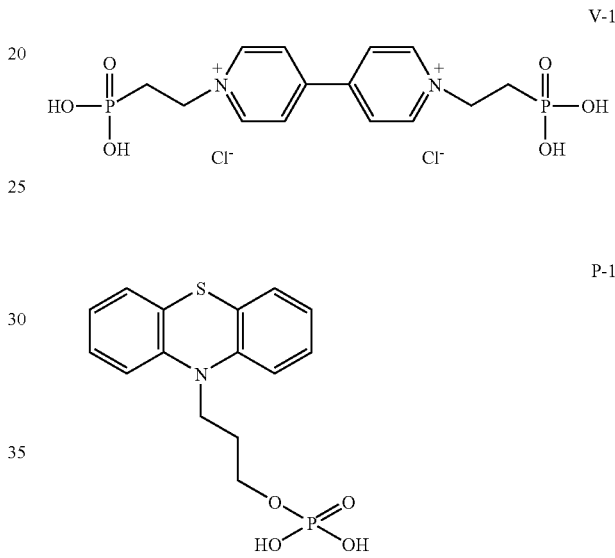

V-1 and P-1 were respectively dissolved in water and in a mixture of chloroform and methanol, with a concentration of 0.02 ml/l, and the titanium oxide porous electrode prepared in (i) was immersed in the V-1 solution while the tin oxide porous electrode prepared in (ii) was immersed in the P-1 solution, and chemical adsorption was conducted for 3 hours at 40° C. After the chemical adsorption, the glasses were rinsed with respective solvents, and were dried under vacuum.

The adsorption of the electrochromic material onto the nanoparticles may also be achieved, in addition to the immersion method described above, by mixing the material in the coating liquid thereby causing adsorption at the coating of the nanoparticles onto the transparent conductive glass in the step (i) or (ii).

(iv) Assembly of Filter Element

Figure 4:
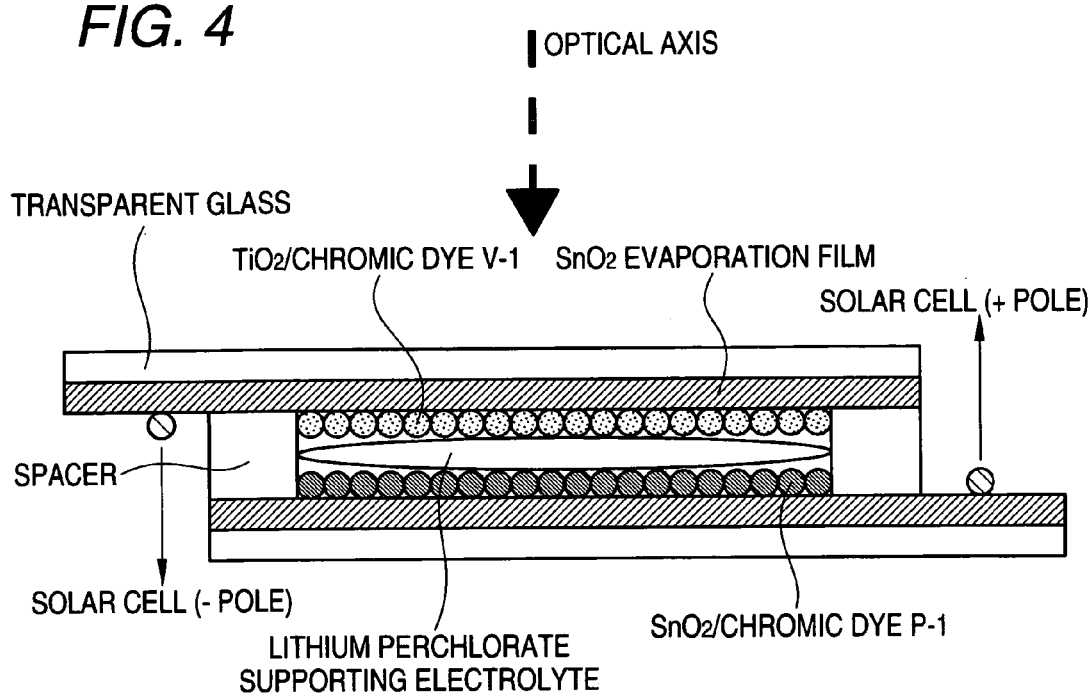
FIG. 4 shows a schematic cross-sectional view showing a configuration of an example (light regulating filter) of an optical density changing element of the present invention.

The titanium oxide nanoporous electrode adsorbing the dye V-1 and the tin oxide nanoporous electrode adsorbing the dye P-1 were opposed as shown in FIG. 4, and, in a gap therebetween, a 0.2 mol/l γ-butyrolactone solution of lithium perchlorate was sealed as an electrolyte to obtain a light-regulating filter. In the connection with the solar cell, the titanium oxide nanoporous electrode adsorbing the dye V-1 was connected to a (–) pole of the solar cell and the tin oxide nanoporous electrode adsorbing the dye P-1 to a (+) pole.

(2) Solar Cell

Figure 5:
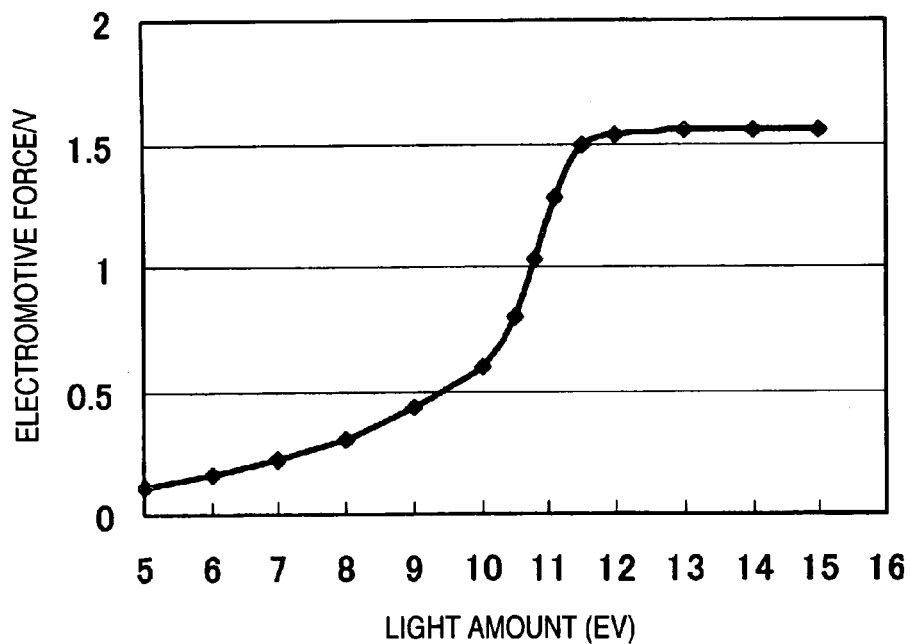
FIG. 5 shows a graph showing electromotive response characteristics of a solar cell employed in Reference Example 1.

As the solar cell, there was employed a silicon cell SS-3012DS (manufactured by Sinonar Co.), and unit cells of such solar cell were serially connected to obtain an electromotive force of about 1.5 V. Electromotive characteristics of the used solar cell to a pseudo solar light (a xenon lamp and an AM1.5 spectral filter manufactured by Oriel Co.) are shown in FIG. 5 as a function of light amount.

The (1) light regulating filter and the (2) solar cell mentioned above were used to prepare a film unit with lens of a configuration shown in Table 1. It had a film sensitivity of ISO 1600, a diaphragm aperture of F8 and a shutter speed of 1/85 sec. The photographing system constituted as explained above provides a negative image of an optimum density in a photographing operation under a condition of EV=8.4.

TABLE 1

| sample No. | solar cell | light regulating filter |
|---|---|---|
| 101 (comp. ex.) | absent | filter absent |
| 102 (ref. ex.) | present | filter present |

Figure 6:
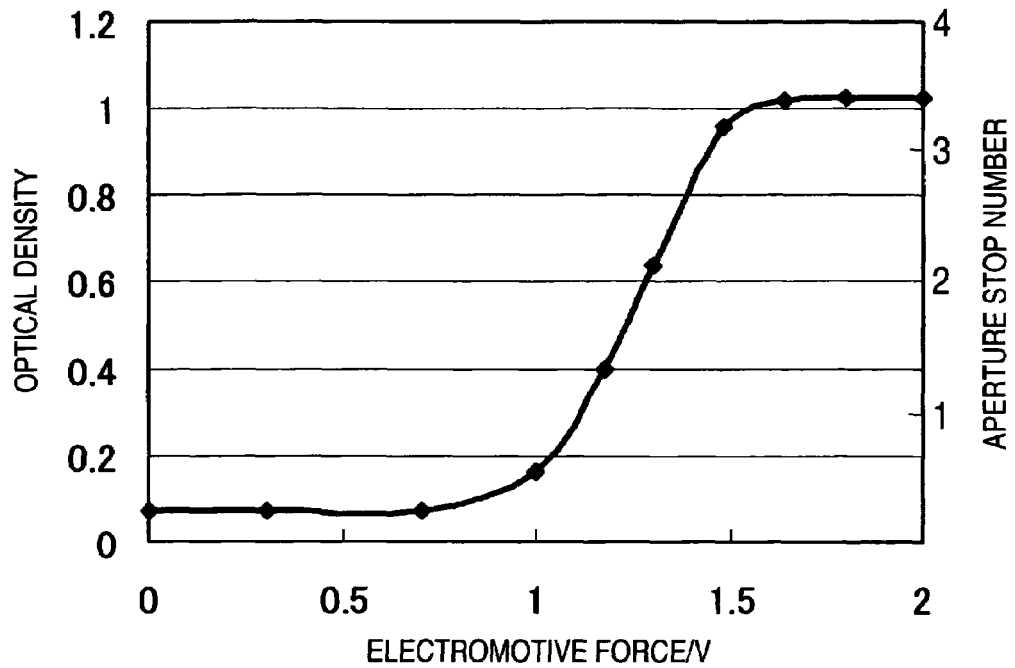
FIG. 6 shows a graph showing electromotive response characteristics of a light regulating filter prepared in Reference Example 1.
Figure 7:
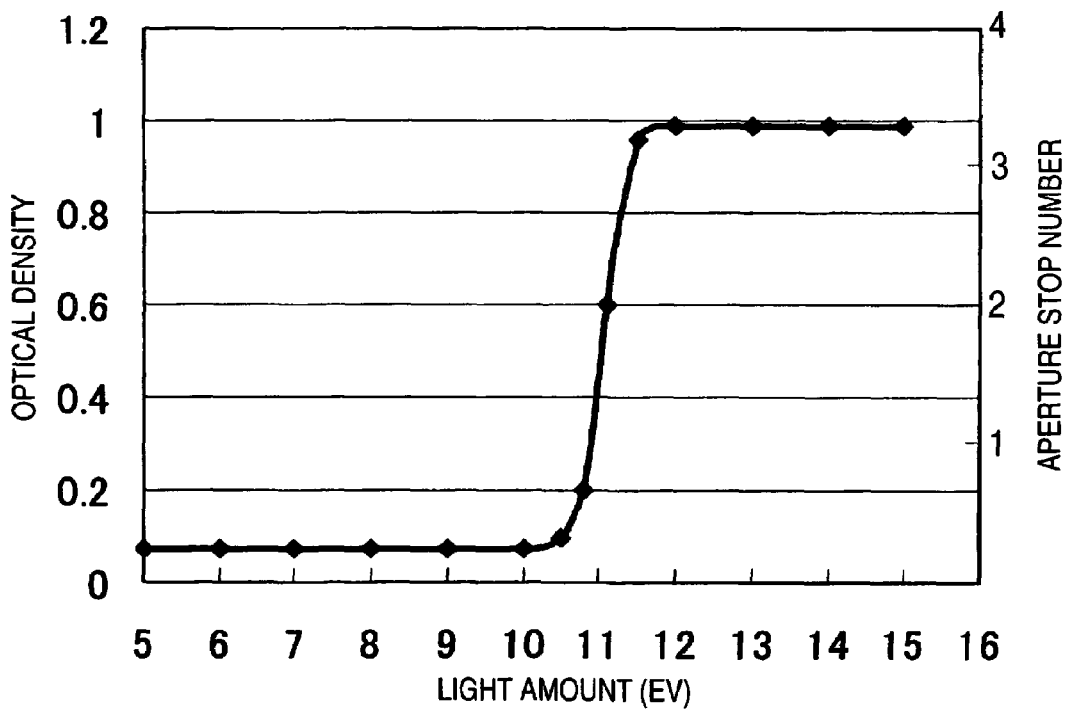
FIG. 7 shows a graph showing electromotive response characteristics of an optical element prepared in Reference Example 1.

Optical density characteristics of the optical device employed in the sample 102 are shown in FIG. 6, as a function of the electromotive force of the solar cell. Also optical density response characteristics of the optical device, constituted of the solar cell and the light regulating filter are shown in FIG. 7, as a function of the light amount. The indicated optical density is an average over $\lambda$=400-700 nm. Also there is indicated an increase in so-called "aperture stop number", employed in ordinary photographing systems, corresponding to each increase of the optical density. For example, an increase by +1 in the aperture stop number corresponds to a reduction of the transmitted light amount to ½, or to an increase in the optical density by 0.3. As shown in FIG. 7, the aperture stop number of the optical device, being +0.2 when the light is intercepted, increased to +2.0 under an irradiation of the light of EV=11.0 and to +3.2 under an irradiation of the light of EV=11.5 or higher. Such change had a response time of 5 seconds. EV is a value indicating a brightness, and is calculated from a following equation (2) from a brightness L represented by a practical unit "lux" for an illumination intensity:

$$EV = \log_2(L/2.4) \qquad (2)$$

In relation to the aperture stop number mentioned above, an increase by +1 in the aperture stop number corresponds to a decrease by 1 of the EV value of the light received through the optical device.

The aforementioned units 101, 102 were subjected to photographing operations under brightness conditions of EV=6.4 (corresponding to a dark indoor environment) to 15.4 (corresponding a bright summer outdoor condition), and developed in a CN-16 developing process of Fuji Photo Film Co. for 3 minutes and 15 seconds. Exposure levels obtained on the negative film are shown in Table 2. An exposure level indicates an appropriateness of the negative density after the processing, with an optimum negative density represented by 0. In the photographing system employed in the present example, as explained above, there is obtained an optimum negative density, exposure level=0, in a photographing operation under a condition EV=8.4. An exposure level +1 means a density higher than an optimum gray density by 1 stop (corresponding to an optical density higher by 0.3), and an exposure level −1 means a density lower than an optimum gray density by 1 stop (corresponding to an optical density lower by 0.3).

TABLE 2

| | photographing condition | | | | | | | | | |
|---|---|---|---|---|---|---|---|---|---|---|
| sample | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 101 (comp.ex.) | −2.0 | −1.0 | 0 | +1.0 | +2.0 | +3.0 | +4.0 | +5.0 | +6.0 | +7.0 |
| 102 (ref. ex.) | −2.2 | −1.2 | −0.2 | +0.8 | +1.8 | +0.0 | +0.8 | +1.8 | +2.8 | +3.8 |

In case of obtaining a print from thus obtained negative image, a certain aberration in the exposure level is correctable. More specifically, a correction at the printing operation is possible for negative films of exposure levels within a range from −1 to +4, and a "successfully taken photograph" can be obtained. In case the exposure level is not within the aforementioned range, a sufficient correction cannot be realized at the printing operation, thus resulting in a "failed photograph". Table 3 shows whether a photograph printed from the negative photographed under the aforementioned condition is successful or not, wherein (+) indicates a success and (−) indicates a failure.

TABLE 3

| | Photographing condition | | | | | | | | | |
|---|---|---|---|---|---|---|---|---|---|---|
| sample | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 101 (comp.ex.) | − | + | + | + | + | + | + | − | − | − |
| 102 (invention) | − | − | + | + | + | + | + | + | + | + |

Table 3 indicates the following. The sample 102 having the light regulating system (reference example), in comparison with the comparative example 101 not having the light regulating system (comparative example), showed a somewhat narrower photographable range under conditions of lower illumination intensity (conditions of smaller EV) but a much wider photographable range under conditions of higher illumination intensity (conditions of larger EV), thus realizing a camera system of a wider photographable range in total.

Reference Example 2

In the following, there will be shown a reference example in which the material of the semiconductor nanoparticles was changed.

A prepared filter element and a film with lens incorporating such filter element had an appearance and a function similar to those of Reference Example 1. In the following, there will be explained details and preparing methods for (1) the light-regulating filter and (2) the solar cell.

(1) Light-Regulating Filter

A light-regulating filter was prepared by a procedure of (i) coating of tin oxide nanoparticles for cathode, (ii) coating of tin oxide nanoparticles for anode, (iii) adsorption of electrochromic materials, and (iv) assembly of a filter element.

(i) Coating of Tin Oxide Nanoparticles for Cathode

In an aqueous dispersion of tin oxide of a diameter of about 40 nm, polyethylene glycol (molecular weight 20,000) was added and agitated uniformly to obtain a coating liquid. A transparent glass with an antireflective layer conductive $SnO_2$ sputtered film of thickness 0.7 mm, was employed as a coating substrate. On the $SnO_2$ film of the transparent conductive glass, the coating liquid was coated uniformly so as to obtain an amount of tin oxide of 9 $g/m^2$. After the coating, the coated glass substrate was calcined for 30 minutes at 450° C. to eliminate the polymer, thereby obtaining a tin oxide nanoporous electrode. The electrode prepared in the aforementioned process had a surface roughness factor of about 750.

A light-regulating filter was obtained by executing (ii) coating of tin oxide nanoparticles for anode, (iii) adsorption of electrochromic materials and (iv) assembly of filter element in the same manner as in Reference Example 1 except for a change in the nanoporous cathode electrode.

(2) Solar Cell

A solar cell similar to that in Reference Example 1 was employed.

The (1) light-regulating filter and the (2) solar cell mentioned above were mounted in a film with lens in a method similar to that in Reference Example 1. A comparative experiment similar to that for the film with lens of Reference Example 1 provided similar effects.

Reference Example 3

In the following, there will be shown a reference example in which the material of the semiconductor nanoparticles was changed.

A prepared filter element and a film with lens incorporating such filter element had an appearance and a function similar to those of Reference Example 1. In the following, there will be explained details and preparing methods for (1) the light-regulating filter and (2) the solar cell.

(1) Light-regulating Filter

A light-regulating filter was prepared by a procedure of (i) coating of zinc oxide nanoparticles for cathode, (ii) coating of tin oxide nanoparticles for anode, (iii) adsorption of electrochromic materials, and (iv) assembly of a filter element.

(i) Coating of Zinc Oxide Nanoparticles for Cathode

In an aqueous dispersion of zinc oxide of a diameter of about 30 nm, polyethylene glycol (molecular weight 20,000) was added and agitated uniformly to obtain a coating liquid. A transparent glass with an antireflective layer of conductive $SnO_2$ sputtered film of a thickness of 0.7 mm was employed as a coating substrate. On the $SnO_2$ film of the transparent conductive glass, the coating liquid was coated uniformly so as to obtain an amount of zinc oxide of 9 $g/m^2$. After the coating, the coated glass substrate was calcined for 30 minutes at 450° C. to eliminate the polymer, thereby obtaining a zinc oxide nanoporous electrode. The electrode prepared in the aforementioned process had a surface roughness factor of about 750.

A light-regulating filter was obtained by executing (ii) coating of tin oxide nanoparticles for anode, (iii) adsorption of electrochromic materials and (iv) assembly of filter element in the same manner as in Reference Example 1 except for a change in the nanoporous cathode electrode.

(2) Solar Cell

A solar cell similar to that in Reference Example 1 was employed.

The (1) light-regulating filter and the (2) solar cell mentioned above were mounted in a film with lens in a method similar to that in Reference Example 1. A comparative experiment similar to that for the film unit with lens of Reference Example 1 provided similar effects.

Reference Example 4

The present reference example is an example in which a number of dyes is increased. A light-regulating filter was prepared in the same manner as in Reference Example 1 except that the 0.02 mol/l aqueous solution of the chromic dye V-1 in Reference Example 1 was replaced by a 0.02 mol/l mixed aqueous solution of following chromic dyes V-7 and V-8, then connected with a solar cell same as in Reference Example 1 and was mounted on a film with lens. In a comparative experiment similar to that for the film unit with lens of Reference Example 1, the present Reference Example provided a light-regulating effect well balanced over the entire visible range. It is thus possible to obtain a light-regulating element of a desired effect by combining dyes arbitrarily.

Chromic Dyes (V-7) and (V-8)

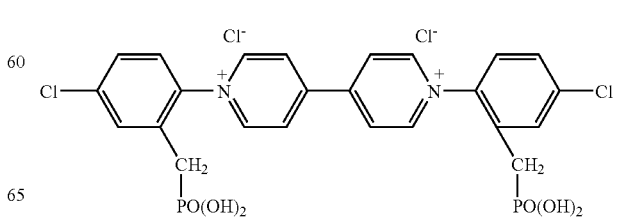

-continued

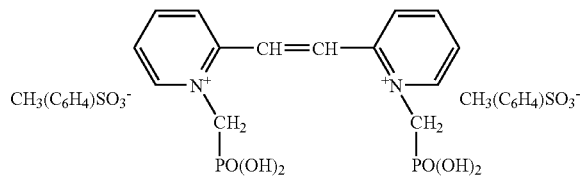

V-8

Example 1

Figure 10:
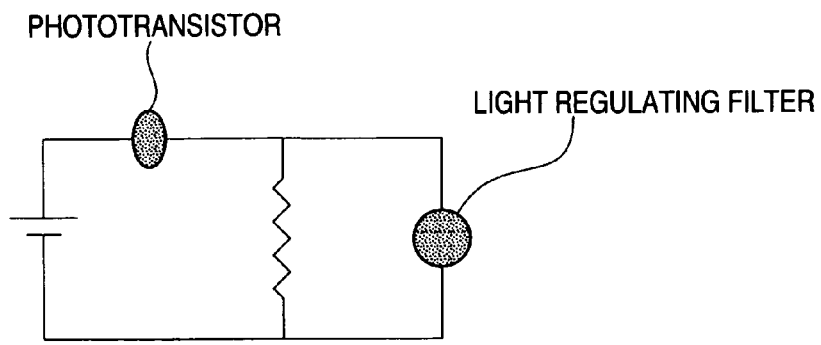
FIG. 10 shows a schematic view showing a circuit configuration of an control apparatus for an optical density changing element of the invention.

The present example employs a dry battery and a phototransistor as the electromotive force generating element, in place for the solar cell in the foregoing reference examples, and also employs a resistor connected in parallel to the electrochromic element (cf. circuit diagram in FIG. 10). The solar cell in Reference Example 2 was replaced by a smaller phototransistor (PT380 manufactured by Sharp Inc.), and a dry battery for an electronic strobe light (U-3, 1.5V) was employed as a power source. The employed resistor had a resistance of 1.2 kΩ. A light regulating filter employed was same as in Reference Example 2. In a comparative experiment on the film with lens in Reference Examples, the present example showed similar effects in the photographing operation.

In the following, a result of comparison on the light response is also shown for a case (Reference Example 5) in which, in Reference Example 2, a resistor 1.2 kΩ was connected in parallel to the electrochromic element.

apparatus 101: electrochromic element x resistor connected in parallel thereto x solar cell;

apparatus 102: electrochromic element x resistor connected in parallel thereto x dry battery x phototransistor.

TABLE 4

|  | structure of control apparatus | area of photosensor | light response |
|---|---|---|---|
| apparatus 101 (ref. ex. 5) | solar cell | 400 mm² | − |
| apparatus 102 (example 1) | phototransistor and dry battery | 7 mm² | + |

Light Response

A light response was tested by whether the electrochromic element generated color within 20 seconds when the electrochromic element control apparatus was moved from a situation of EV8 (corresponding to a dark sun shade) to EV14 (corresponding to a fine outdoor condition). Such test was repeated 100 times, and (+) indicates 95 or more color generations within 20 seconds, and (−) indicates less than 95 times.

Table 4 indicates that a case of employing a phototransistor and a dry battery improved the response to light in comparison with a case of employing a solar cell. Also a smaller area of the photosensor decreased a risk that the photosensor is covered by a finger.

Example 2

Figure 8:
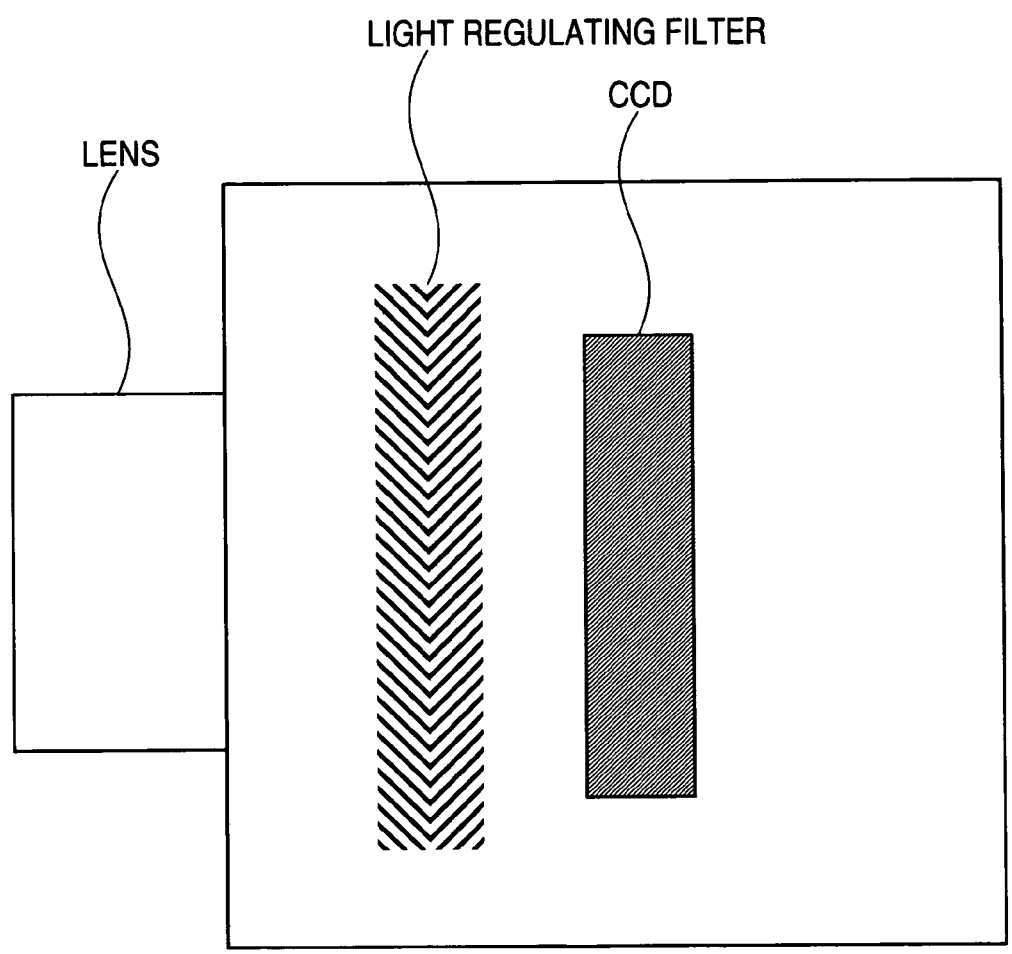
FIG. 8 shows a schematic cross-sectional view of a principal portion of an electronic still camera having an optical element of the present invention.
Figure 9:
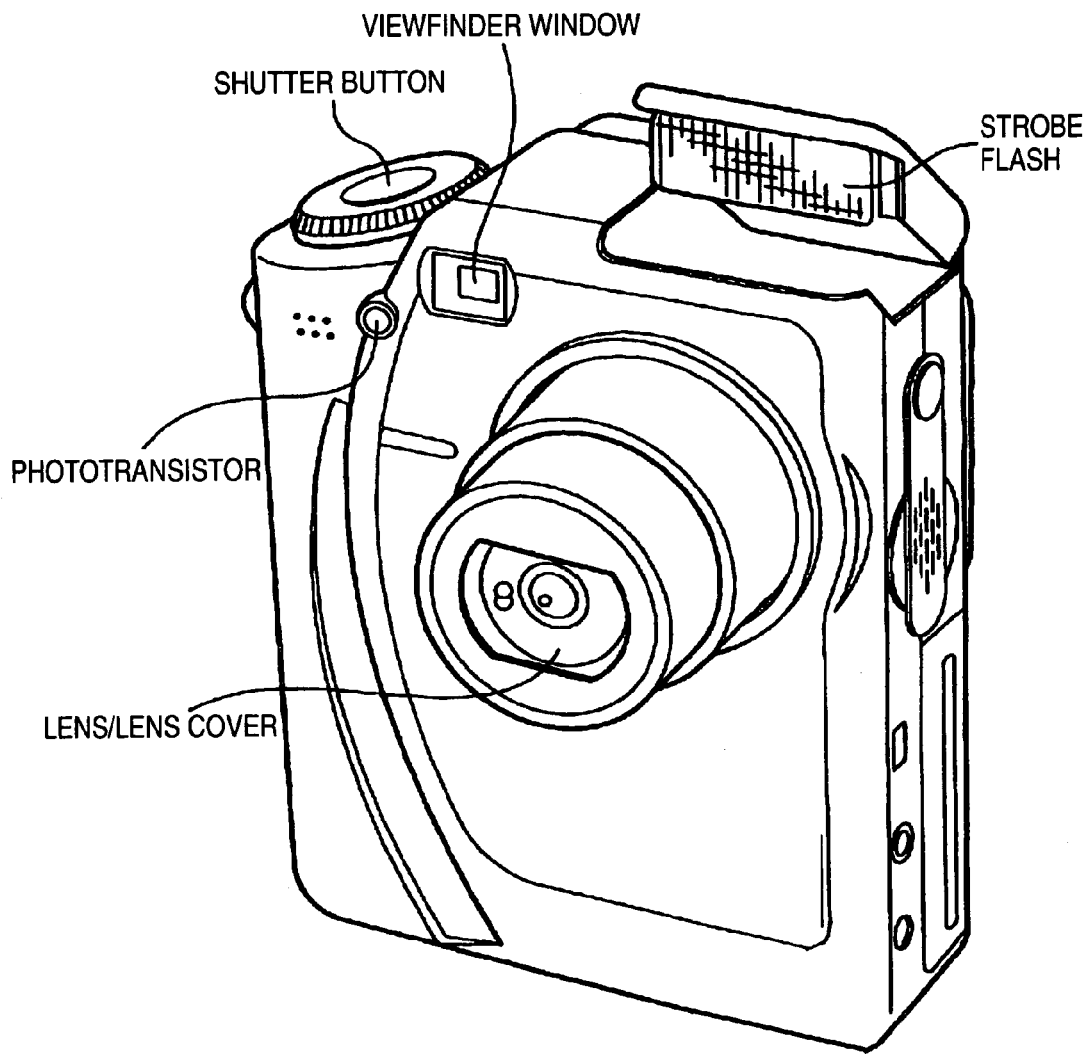
FIG. 9 shows a schematic external view of an example of an electronic still camera having an optical element of the present invention.

The present example provides an electronic still camera equipped with a light regulating filter. An electronic still camera of the present example is provided, as shown in FIG. 8, with a light regulating filter prepared in Reference Example 2 between a lens and a CCD, and a phototransistor same as in Example 1 was mounted in an external part as shown in FIG. 9 and was so connected as to control the light regulating filter, utilizing a battery incorporated in the electronic still camera as a power source. In a comparative experiment similar to that on the film unit with lens in Reference Example 2, the invention showed a light regulating effect more conspicuous in the electronic still camera having a narrower dynamic range than in the film unit with lens.

Example 3

The present example provides a photographing unit for a cellular phone, equipped with a light regulating filter. A light regulating filter prepared in the same manner as in Reference Example 2 was mounted on a lens of a photographing unit of a cellular phone, and a phototransistor same as in Example 1 was mounted around the photographing unit and was so connected as to control the light regulating filter, utilizing a battery incorporated in the cellular phone as a power source. The cellular phone equipped with the photographing unit of the present example was capable of photographing in wider exposure conditions in comparison with a photographing unit not equipped with the optical element of the invention.

The control apparatus of the invention enables, by separating the electromotive force generating element responding to the electromagnetic wave into an electromagnetic wave sensor responding to the electromagnetic wave and a voltage source generating an electromotive force, to achieve a space saving, an improvement in response and a stable voltage supply.

The entire disclosure of each and every foreign patent application from which the benefit of foreign priority has been claimed in the present application is incorporated herein by reference, as if fully set forth.

What is claimed is:

1. A control apparatus for an optical density changing element that is used under the condition of EV=8.4 or higher comprising:

an electromotive force generating element comprising an electromagnetic wave sensor and a voltage source, wherein the electromotive force generating element generates an electromotive force;

an optical density changing element that has a change in optical density at a light amount in which EV has a value of 8.4 or higher including an electrochromic material driven by the electromotive force; and a resistor connected in parallel to the optical density changing element;

wherein the optical density changing element consists of a pair of an anode and a cathode; and includes at least two different electrochromic materials that change optical densities at different wavelengths between the pair of the anode and the cathode.

2. The control apparatus according to claim 1, wherein the optical density changing element includes a nanoporous semiconductor material in which the electrochromic material is adsorbed, and the nanoporous semiconductor material has a roughness factor larger than 20.

3. The control apparatus according to claim 2, wherein the optical density changing element includes at least two layers of the nanoporous semiconductor material in which the electrochromic material is adsorbed.

4. The control apparatus according to claim 1, wherein the optical density changing element in a color erased state has an optical density of 0.2 or less at a wavelength of 400 nm.

5. The control apparatus according to claim 1, wherein the optical density changing element in a color erased state has an average optical density of 0.1 or less in each of a wavelength range of 400 to 500 nm, a wavelength range of 500 to 600 nm and a wavelength range of 600 to 700 nm.

6. The control apparatus according to claim 1, wherein the electromagnetic wave sensor is a material of which resistance changes according to an intensity of an electromagnetic wave.

7. The control apparatus according to claim 1, wherein the voltage source of the optical density changing element is a battery.

8. The control apparatus according to claim 1, wherein the electromagnetic wave sensor is a phototransistor.

9. The control apparatus according to claim 1, wherein the control apparatus is used under the condition of EV=10 or higher.

10. A photographing system comprising a photosensitive material and a control apparatus for regulating the amount of light that is transmitted to the photosensitive material, wherein the control apparatus comprises the control apparatus according to claim 1.

11. A method for regulating the amount of light that is transmitted through a filter, comprising:
subjecting a control apparatus for an optical density changing element to a light condition of EV=8.4 or higher, wherein the control apparatus for the optical density changing element comprises:
an electromotive force generating element comprising an electromagnetic wave sensor and a voltage source, wherein the electromotive force generating element generates an electromotive force;
an optical density changing element including an electrochromic material driven by the electromotive force; and
a resistor connected in parallel to the optical density changing element;
wherein the optical density changing element consists of a pair of an anode and a cathode; and includes at least two different electrochromic materials that change optical densities at different wavelengths between the pair of the anode and the cathode, to thereby regulate the amount of light that is transmitted through the optical density changing element.

12. The method according to claim 11, wherein the control apparatus is subjected to a light condition of EV=10 or higher.

13. The method according to claim 11, wherein the optical density changing element regulates the amount of light arriving at a photosensitive material.

14. The method according to claim 11, wherein the photosensitive material is a film.

15. The method according to claim 11, wherein the optical density changing element regulates the amount of light arriving at a CCD or CMOS device.

* * * * *